United States Patent
Zhang et al.

(10) Patent No.: US 11,546,968 B2
(45) Date of Patent: Jan. 3, 2023

(54) TRAFFIC-RATE BASED BRANCH DEACTIVATION FOR UE POWER EFFICIENCY IN A DUAL-CONNECTIVITY MODE

(71) Applicant: Apple Inc., Cupertino, CA (US)

(72) Inventors: Wei Zhang, Santa Clara, CA (US); Fangli Xu, Beijing (CN); Haitong Sun, Irvine, CA (US); Sriram Subramanian, Santa Clara, CA (US); Vishwanth Kamala Govindaraju, Mountain View, CA (US); Johnson O. Sebeni, Fremont, CA (US); Dawei Zhang, Saratoga, CA (US); Hong He, Cupertino, CA (US); Yuchul Kim, Santa Clara, CA (US); Haijing Hu, Beijing (CN); Yuqin Chen, Shenzhen (CN); Wei Zeng, San Diego, CA (US); Sanjeevi Balasubramanian, San Jose, CA (US); Sandeep K. Sunkesala, San Jose, CA (US); Tarakkumar G. Dhanani, San Jose, CA (US); Madhukar K. Shanbhag, Santa Clara, CA (US); Shiva Krishna Narra, San Jose, CA (US); Longda Xing, San Jose, CA (US); Srinivasan Nimmala, San Jose, CA (US); Sree Ram Kodali, Sunnyvale, CA (US); Murtaza A. Shikari, Mountain View, CA (US); Sethuraman Gurumoorthy, San Jose, CA (US); Srirang A. Lovlekar, Cupertino, CA (US); Xu Ou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/968,846

(22) PCT Filed: Aug. 15, 2019

(86) PCT No.: PCT/CN2019/100811
§ 371 (c)(1),
(2) Date: Aug. 10, 2020

(87) PCT Pub. No.: WO2021/026892
PCT Pub. Date: Feb. 18, 2021

(65) Prior Publication Data
US 2021/0051767 A1    Feb. 18, 2021

(51) Int. Cl.
*H04W 4/00* (2018.01)
*H04W 88/10* (2009.01)
(Continued)

(52) U.S. Cl.
CPC ........... *H04W 88/10* (2013.01); *H04W 24/08* (2013.01); *H04W 72/042* (2013.01);
(Continued)

(58) Field of Classification Search
None
See application file for complete search history.

(56) References Cited

U.S. PATENT DOCUMENTS

| 2012/0281566 A1* | 11/2012 | Pelletier | ............... H04W 76/27 370/252 |
| 2019/0174342 A1 | 6/2019 | Yokoyama et al. | |

(Continued)

FOREIGN PATENT DOCUMENTS

| CN | 107182132 A | 9/2017 |
| CN | 109547176 A | 3/2019 |

(Continued)

OTHER PUBLICATIONS

Nokia, R2-1906181, 3GPP TSG-RAN WG2 Meeting #106, May 13-17, 2019 (Year: 2019).*

(Continued)

*Primary Examiner* — Clemence S Han
(74) *Attorney, Agent, or Firm* — Kowert, Hood, Munyon, Rankin & Goetzel, P.C.

(57) ABSTRACT

A user equipment (UE) device may reside in a state of dual connectivity with a master cell group (MCG) and a secondary cell group (SCG), wherein the radio access technologies of the MCG and the SCG are different. While in the dual (Continued)

connectivity state, the UE device may transition to a mode of reduced activity (e.g., processing and/or RF activity) relative to the secondary cell group (SCG) in order to save power, e.g., when traffic flow via the SCG is below a threshold, or when scheduling activity on the SCG is low. Various mechanisms may be employed to reduce activity, e.g., mechanisms such as reduction of beam monitoring, deactivation of secondary cells of the SCG, reduction of number of active antenna elements, employment of longer periods for periodic measurement and reporting processes, etc.

20 Claims, 18 Drawing Sheets

(51) Int. Cl.
    *H04W 88/02*     (2009.01)
    *H04W 76/15*     (2018.01)
    *H04W 24/08*     (2009.01)
    *H04W 72/04*     (2009.01)
    *H04W 76/27*     (2018.01)

(52) U.S. Cl.
    CPC ... *H04W 72/0413* (2013.01); *H04W 72/0426* (2013.01); *H04W 76/15* (2018.02); *H04W 76/27* (2018.02); *H04W 88/02* (2013.01)

(56) References Cited

U.S. PATENT DOCUMENTS

| | | | | |
|---|---|---|---|---|
| 2019/0182716 | A1* | 6/2019 | Futaki | H04W 76/27 |
| 2019/0320467 | A1* | 10/2019 | Freda | H04L 5/0055 |
| 2021/0392537 | A1* | 12/2021 | Da Silva | H04W 76/25 |
| 2022/0141904 | A1* | 5/2022 | Yilmaz | H04L 5/0035 370/329 |

FOREIGN PATENT DOCUMENTS

| | | |
|---|---|---|
| CN | 109587705 A | 5/2019 |
| WO | 2019057269 A1 | 3/2019 |

OTHER PUBLICATIONS

Oppo, R2-1905591, 3GPP TSG-RAN WG2 Meeting #106, Apr. 13-17, 2019 (Year: 2019).*
International Search Report and Written Opinion, Application No. PCT/CN2019/100811, dated May 14, 2020, 9 pages.

* cited by examiner

1500

| while the wireless UE device is in a state of dual connectivity to a master node and a secondary node, enter a mode wherein activity of the UE device with respect to the secondary node is reduced relative to activity with respect to a primary cell of the secondary node 1510 |

*FIG. 15*

1700 while the wireless UE device is in a state of dual connectivity to a master node and a secondary node: 1710

- transmit a traffic threshold, wherein the traffic threshold represents a boundary between (a) traffic rates sufficiently small so that reduction in activity relative to the secondary node is recommended and (b) traffic rates sufficiently large so that reduction in activity relative to the secondary node is not recommended 1715
- receive a message directing the UE device to enter of mode of reduced activity relative to the secondary node from the master node or the secondary node 1720

*FIG. 17*

1800 while the wireless UE device is in a state of dual connectivity to a master node and a secondary node: 1810

- transmit an event report to the master node or the secondary node, wherein the event report indicates that uplink traffic from the UE device to the secondary node is expected to be less than a traffic threshold 1815
- receive a command from the master node or the secondary node, wherein the command directs the UE device to reduce activity relative to the secondary node 1820

*FIG. 18*

$$(P_T^L T_T^L + P_P^L t_P^L + P_O^L t_O^L) \cdot N_{DRX}^L < (P_T^N t_T^N + P_P^N t_P^N + P_{BM}^N t_{BM}^N + P_O^N t_O^N) \cdot N_{DRX}^N$$

$$P_T^L T_T^L + P_P^L T_P^L + P_O^L T_O^L < P_T^N T_T^N + P_P^N T_P^N + P_{BM}^N T_{BM}^N + P_O^N T_O^N$$

$$P_P^L T_P^L \approx P_P^N T_P^N$$
$$P_O^L T_O^L \approx P_O^N T_O^N$$
$$\Downarrow$$
$$P_T^L T_T^L < P_T^N T_T^N + P_{BM}^N T_{BM}^N$$

$$T_T = \frac{L}{R}$$
$$\Downarrow$$
R is throughput $$\frac{P_T^L}{R^L} L < \frac{P_T^N}{R^N} L + P_{BM}^N T_{BM}^N$$

$$\left( \frac{P_T^L}{R^L} - \frac{P_T^N}{R^N} \right) L < P_{BM}^N T_{BM}^N$$

$$T_{BM}^N = \frac{T}{20ms} \cdot T_{SSB} = T \cdot R_{SSB}$$
$$\Downarrow$$
$$\left( \frac{P_T^L}{R^L} - \frac{P_T^N}{R^N} \right) L < P_{BM}^N T \cdot R_{SSB}$$

$$\boxed{\frac{L}{T} < \frac{P_{BM}^N R_{SSB}}{\left( \frac{P_T^L}{R^L} - \frac{P_T^N}{R^N} \right)}} \text{—1600}$$

FIG. 16

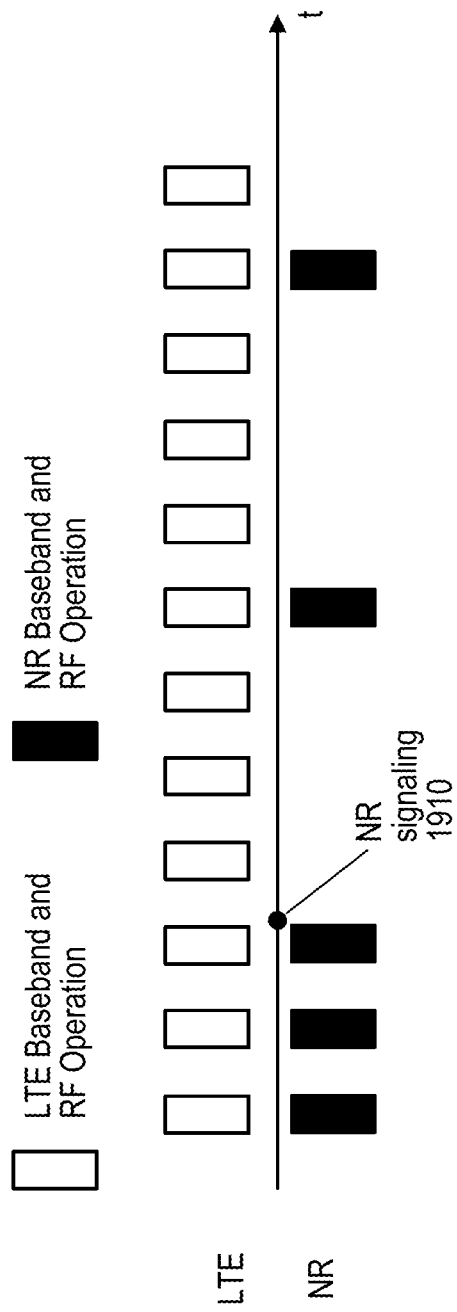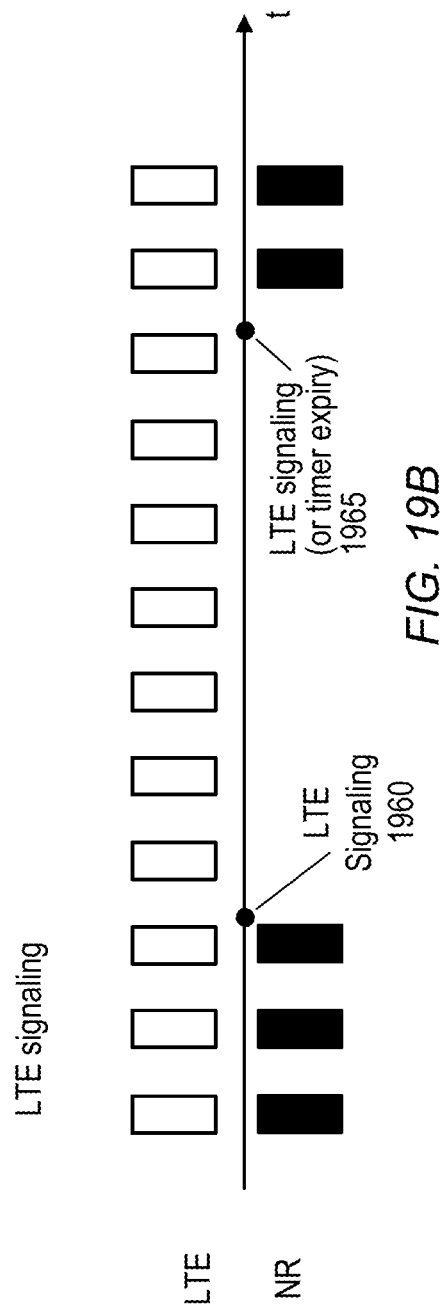

2100 while the wireless UE device is in a state of dual connectivity to a master node and a secondary node:  2110 receive a message directing the UE device to reduce activity relative to the secondary node  2115 reduce said activity of the UE device relative to the secondary node in response to receiving the message  2120

*FIG. 21*

TRAFFIC-RATE BASED BRANCH DEACTIVATION FOR UE POWER EFFICIENCY IN A DUAL-CONNECTIVITY MODE

PRIORITY CLAIM INFORMATION

This application is a national stage application of International Application No. PCT/CN2019/100811, filed on Aug. 15, 2019, titled "Traffic-Rate Based Branch Deactivation for UE Power Efficiency in a Dual-Connectivity Mode", which is hereby incorporated by reference in its entirety.

FIELD

The present disclosure relates to the field of wireless communication, and more particularly, to mechanisms enabling a user equipment device in a state of dual connectivity to conserve power by reducing baseband and/or radio activity relative to a secondary cell group (SCG).

DESCRIPTION OF THE RELATED ART

A user equipment (UE) device may operate in a state of dual connectivity with a master node and a secondary node, wherein the master node and secondary node correspond to different radio access technologies. If the traffic rate on the connection with the secondary node is small, it may be a waste of power to perform processing activity relating to the secondary node, e.g., processing activity such as beam tracking, reference signal monitoring, control channel monitoring, reference signal transmission, especially in the case where the secondary node is configured for carrier aggregation. Thus, there exists a need for mechanisms capable of decreasing the processing burden on the UE device when traffic rate on the secondary node is small.

SUMMARY

In one set of embodiments, a method for operating a wireless user equipment (UE) device may be performed as follows.

While the wireless UE device is in a state of dual connectivity to a master node and a secondary node, the wireless UE device may enter a mode wherein activity of the UE device with respect to the secondary node is reduced relative to activity with respect to a primary cell of the secondary node. (Activity of the UE device relative to secondary cells of the secondary node may be terminated.) The master node may correspond to a first radio access technology; and the secondary node may correspond to a second radio access technology different from the first radio access technology.

In some embodiments, upon entering said mode, the UE device may perform cell measurement and reporting relative to the primary cell of the secondary node, with longer cycle than prior to entering said mode.

In some embodiments, upon entering said mode, the UE device may perform beam tracking relative to the primary cell of the secondary node, with longer cycle than prior to entering said mode.

In some embodiments, upon entering said mode, the UE device may report information regarding channel quality relative to the primary cell of the secondary node, with longer cycle than prior to entering said mode.

In some embodiments, upon entering said mode, the UE device may perform transmissions of sounding reference signals (SRSs) to the primary cell of the secondary node, with longer cycle than prior to entering said mode.

In some embodiments, upon entering said mode, the UE device may terminate monitoring of a Physical Downlink Shared Channel (PDSCH) of the primary cell of the secondary node.

In some embodiments, upon entering said mode, the UE device may terminate monitoring of a Physical Downlink Control Channel (PDCCH) of the primary cell of the secondary node. In some embodiments, upon entering said mode, the UE device may disable transmission on a Physical Uplink Shared Channel (PUSCH) associated with the secondary node (e.g., a primary component carrier.

In some embodiments, upon entering said mode, the UE device may terminate measurements related to radio link monitoring (RLM) with respect to the secondary node.

In some embodiments, said mode is entered in response to a command from the master node or the secondary node. The command may be received as part of a Radio Resource Control (RRC) message, or as part of a Medium Access Control (MAC) Control Element, or as part of downlink control information (DCI).

In some embodiments, the UE device may start an inactivity timer in response to receiving uplink and/or downlink scheduling with respect to the secondary node. In response to receiving additional uplink and/or downlink scheduling with respect to the secondary node while the inactivity timer is running, the UE device may restart the inactivity timer. The above described mode may be entered in response to expiration of the inactivity timer.

In some embodiments, the UE device may start a timer in response to determining that a traffic rate relating to data communication with the secondary node is less than a threshold. In response to determining that a subsequent traffic rate relating to data communication with the secondary node is greater than the threshold, the UE device may stop the timer. The above described mode may be entered in response to expiration of the timer.

In some embodiments, after having entered said mode, the UE device may transmit a scheduling request to the secondary node in response to determining that an amount of data to be transmitted to the secondary node is greater than a threshold In some embodiments, the master node may be an eNB conforming to 3GPP Long Term Evolution (LTE) specifications; and the secondary node may be a gNB conforming to 5G New Radio (NR) specifications.

In one set of embodiments, a method for operating a wireless UE device may be performed as follows.

While the wireless UE device is in a state of dual connectivity to a master node and a secondary node, the UE device may transmit a traffic threshold, wherein the traffic threshold represents a boundary between (a) traffic rates sufficiently small so that reduction in activity relative to the secondary node is recommended and (b) traffic rates sufficiently large so that reduction in activity relative to the secondary node is not recommended. (The master node may correspond to a first radio access technology; and the secondary node may correspond to a second radio access technology different from the first radio access technology.) The UE device may then receive a message directing the UE device to enter of mode of reduced activity relative to the secondary node from the master node or the secondary node.

In some embodiments, the traffic threshold may be transmitted to the master node.

In some embodiments, the UE device may enter into said mode of reduced activity relative to the secondary node in response to receiving the above described message.

In some embodiments, the traffic threshold may be determined based on one or more factors, wherein the one or more factors. For example, the one or more factors may include mobility of the wireless UE device. As another example, the one or more factors may include condition of the RF channel relative to the secondary node. As yet another example, the one or more factors may include a configuration of the UE device with respect to a radio access technology (RAT) corresponding to the master node. As yet another example, the one or more factors may include a configuration of the UE device with respect to a radio access technology (RAT) corresponding to the secondary node.

In one set of embodiments, a method for operating a wireless user equipment (UE) device may be performed as follows.

While the wireless UE device is in a state of dual connectivity to a master node and a secondary node, the UE device may: transmit an event report to the master node or the secondary node, wherein the event report indicates that uplink traffic from the UE device to the secondary node is expected to be less than a traffic threshold; and receive a command from the master node or the secondary node. (The master node may correspond to a first radio access technology; and the secondary node may correspond to a second radio access technology different from the first radio access technology.) The command may direct the UE device to reduce activity relative to the secondary node.

In some embodiments, the UE device may receive a message that enables the UE device to generate and transmit the event report.

In one set of embodiments, a method for operating a wireless user equipment (UE) device may be performed as follows.

While the wireless UE device is in a state of dual connectivity to a master node and a secondary node, the UE device may: receive a message directing the UE device to reduce activity relative to the secondary node; and reduce said activity of the UE device relative to the secondary node in response to receiving the message. The master node may correspond to a first radio access technology; and the secondary node may correspond to a second radio access technology different from the first radio access technology.

In some embodiments, said reduction of activity includes one or more of: reduction of monitoring of downlink control information (DCI) relative to the secondary node; reduction of beam management operations relative to the secondary node.

In some embodiments, the action of reducing activity may include changing a bandwidth part (BWP) associated with the UE device to reduce a search space for said downlink control information.

In some embodiments, the action of reducing activity may include changing a discontinuous reception cycle (DRX) so that DRX wakeup is less frequent.

In some embodiments, the action of reducing activity may include suspending an action of monitoring for Downlink Control Information (DCI) at least for a period of time.

In some embodiments, the action of reducing activity may include monitoring a subset of reference signals for beam management with respect to the secondary node.

In some embodiments, the action of reducing activity may include suspending or reducing reporting related to beam management with respect to the secondary node.

In some embodiments, the action of reducing activity may include suspending or reducing uplink beam management with respect to the secondary node.

In some embodiments, the action of reducing activity may include operating in a signal panel only mode with respect to the secondary node.

BRIEF DESCRIPTION OF THE DRAWINGS

A better understanding of the present subject matter can be obtained when the following detailed description of the preferred embodiment is considered in conjunction with the following drawings.

FIG. 15 illustrates an example of a method for reducing activity of a secondary cell group while a user equipment is in a mode of dual connectivity with a master node and a secondary node, according to some embodiments. (The secondary node hosts or provides the secondary cell group for the UE.)

FIG. 16 is a mathematical derivation of a traffic rate threshold that is useable determine when transmission via one radio access technology is favored over transmission via another radio access technology, according to some embodiments.

FIG. 17 illustrates an example of a method for transmitting traffic threshold information from a user equipment to a network, enabling the network to determine when the user equipment would benefit from a reduction in activity on a secondary cell group, according to some embodiments.

FIG. 18 illustrates an example of a method for recommending reduction of activity on a secondary cell group by transmitting an event report to a network, according to some embodiments.

FIGS. 19A and 19B illustrate examples of methods for reducing baseband and/or RF activity on a New Radio branch based on signaling received from a network, according to some embodiments.

FIG. 21 illustrates an example of a method enabling a user equipment to reducing activity with respect to a secondary cell group in response to an explicit message from a network, according to some embodiments.

Figure 1:
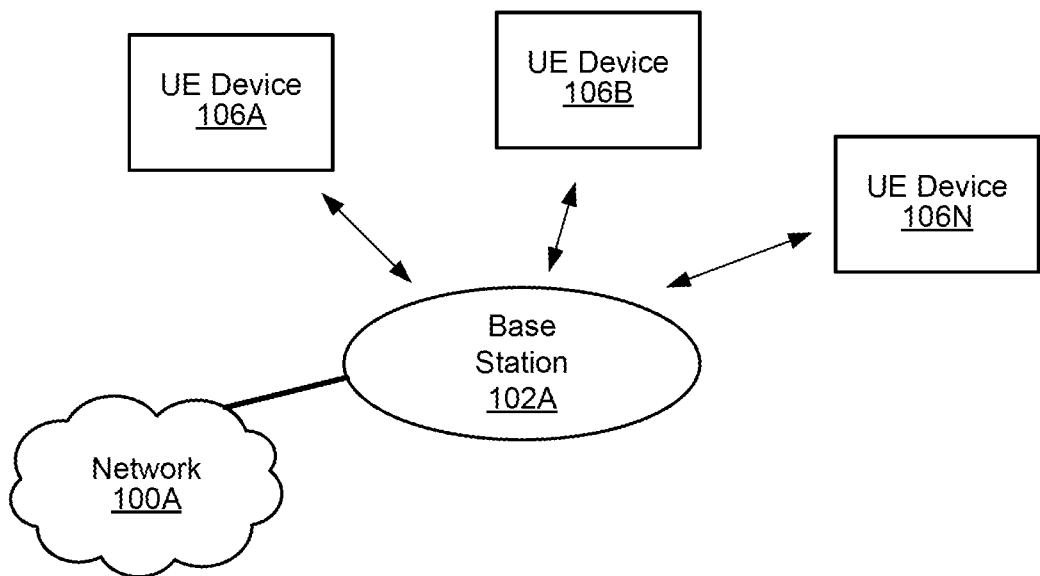
FIGS. 1-2 illustrate examples of wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting on the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in this disclosure.
3GPP: Third Generation Partnership Project
3GPP2: Third Generation Partnership Project 2
5G NR: $5^{th}$ Generation New Radio
BW: Bandwidth
BWP: Bandwidth Part
CA: Carrier Aggregation
C-DRX: Connected DRX
CQI: Channel Quality Indictor
CSI: Channel State Information
DC: Dual Connectivity
DCI: Downlink Control Information
DL: Downlink
DRX: Discontinuous Reception Cycle
eNB (or eNodeB): Evolved Node B, i.e., the base station of 3GPP LTE
EN-DC: E-UTRA NR Dual Connectivity
eUICC: embedded UICC
gNB (or gNodeB): next Generation NodeB, i.e., the base station of 5G NR
GSM: Global System for Mobile Communications
HARQ: Hybrid ARQ
LTE: Long Term Evolution
LTE-A: LTE-Advanced
MAC: Medium Access Control
MAC-CE: MAC Control Element
MBMS: Multimedia Broadcast Multicast Service
MCG: Master Cell Group
MCS: Modulation & Coding Scheme
MO: Mobile Originated
MR-DC: Multi-RAT DC
MT: Mobile Terminated
NR: New Radio
NR-DC: NR Dual Connectivity
NW: Network
RACH: Random Access Channel
RAT: Radio Access Technology
RLC: Radio Link Control
RLF: Radio Link Failure
RLM: Radio Link Monitoring
RRC: Radio Resource Control
RRM: Radio Resource Management
RS: Reference Signal
SCG: Secondary Cell Group
SR: Scheduling Request
SRS: Sounding Reference Signal
SSB: Synchronization Signal Block
UE: User Equipment
UL: Uplink
UMTS: Universal Mobile Telecommunications System Terms The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to any of various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
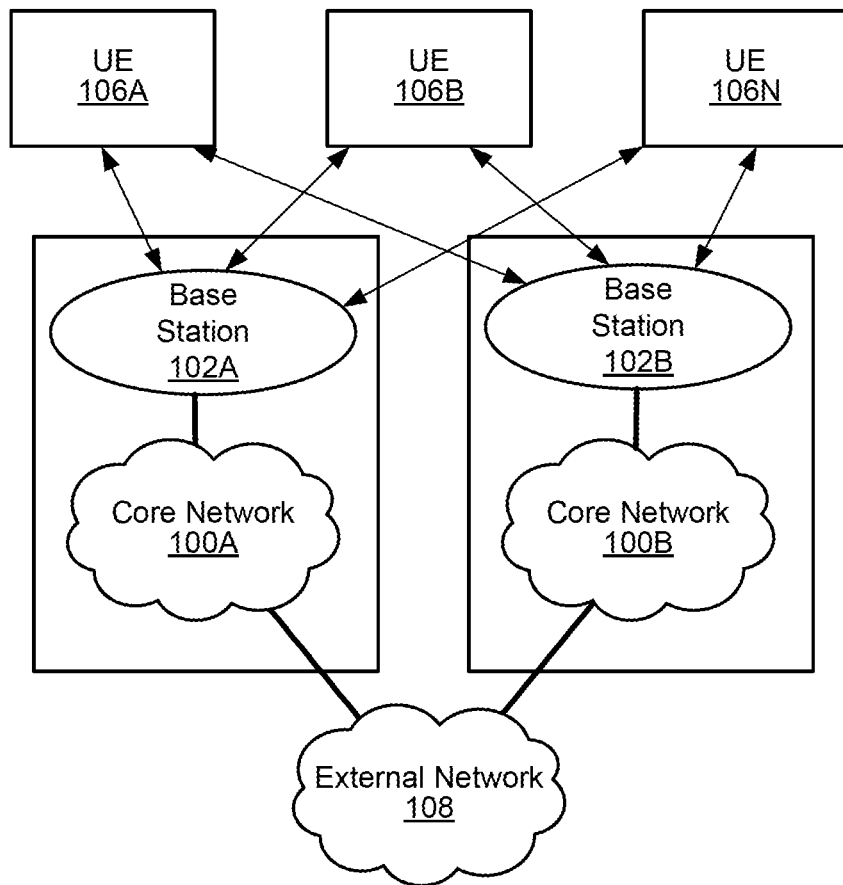
Figure 3:
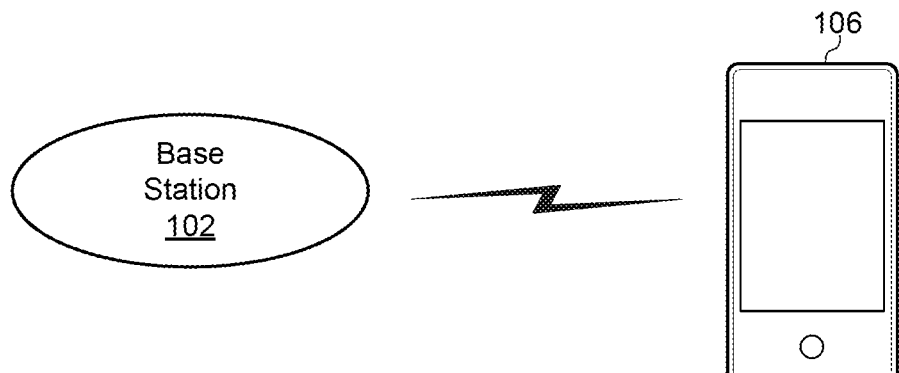
FIG. 3 illustrates an example of a base station in communication with a user equipment device, according to some embodiments.

FIGS. 1-3: Communication System

FIGS. 1 and 2 illustrate exemplary (and simplified) wireless communication systems. It is noted that the systems of FIGS. 1 and 2 are merely examples of certain possible systems, and various embodiments may be implemented in any of various ways, as desired.

The wireless communication system of FIG. 1 includes a base station 102A which communicates over a transmission medium with one or more user equipment (UE) devices 106A, 106B, etc., through 106N. Each of the user equipment devices may be referred to herein as "user equipment" (UE). In the wireless communication system of FIG. 2, in addition to the base station 102A, base station 102B also communicates (e.g., simultaneously or concurrently) over a transmission medium with the UE devices 106A, 106B, etc., through 106N.

The base stations 102A and 102B may be base transceiver stations (BTSs) or cell sites, and may include hardware that enables wireless communication with the user devices 106A through 106N. Each base station 102 may also be equipped to communicate with a core network 100 (e.g., base station 102A may be coupled to core network 100A, while base station 102B may be coupled to core network 100B), which may be a core network of a cellular service provider. Each core network 100 may be coupled to one or more external networks (such as external network 108), which may include the Internet, a Public Switched Telephone Network (PSTN), or any other network. Thus, the base station 102A may facilitate communication between the user devices and/or between the user devices and the network 100A; in the system of FIG. 2, the base station 102B may facilitate communication between the user devices and/or between the user devices and the network 100B.

The base stations 102A and 102B and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc.

For example, base station 102A and core network 100A may operate according to a first cellular communication standard (e.g., LTE) while base station 102B and core network 100B operate according to a second (e.g., different) cellular communication standard (e.g., GSM, UMTS, and/or one or more CDMA2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the network configuration shown in FIG. 2, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., LTE and CDMA 1×RTT, GSM and UMTS, or any other combination of cellular communication technologies) might be coupled to a core network that also supports the different cellular communication technologies. Any of various other network deployment scenarios are also possible.

As a further possibility, it is also possible that base station 102A and base station 102B may operate according to the same wireless communication technology (or an overlapping set of wireless communication technologies). For example, base station 102A and core network 100A may be operated by one cellular service provider independently of base station 102B and core network 100B, which may be operated by a different (e.g., competing) cellular service provider. Thus in this case, despite utilizing similar and possibly compatible cellular communication technologies, the UE devices 106A-106N might communicate with the base stations 102A-102B independently, possibly by utilizing separate subscriber identities to communicate with different carriers' networks.

A UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). As another example, a UE 106 might be configured to communicate using different 3GPP cellular communication standards (such as two or more of GSM, UMTS, LTE, or LTE-A). Thus, as noted above, a UE 106 might be configured to communicate with base station 102A (and/or other base stations) according to a first cellular communication standard (e.g., LTE) and might also be configured to communicate with base station 102B (and/or other base stations) according to a second cellular communication standard (e.g., one or more CDMA2000 cellular communication standards, UMTS, GSM, etc.).

Base stations 102A and 102B and other base stations operating according to the same or different cellular communication standards may thus be provided as one or more networks of cells, which may provide continuous or nearly continuous overlapping service to UEs 106A-106N and similar devices over a wide geographic area via one or more cellular communication standards.

A UE 106 might also or alternatively be configured to communicate using WLAN, Bluetooth, one or more global navigational satellite systems (GNSS, e.g., GPS or GLO-NASS), one and/or more mobile television broadcasting standards (e.g., ATSC-M/H or DVB-H), etc. Other combinations of wireless communication standards (including more than two wireless communication standards) are also possible.

FIG. 3 illustrates user equipment 106 (e.g., one of the devices 106A through 106N) in communication with a base station 102 (e.g., one of the base stations 102A or 102B). The UE 106 may be a device with wireless network connectivity such as a mobile phone, a hand-held device, a computer or a tablet, a wearable device or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS (W-CDMA, TD-SCDMA, etc.), CDMA2000 (1xRTT, 1xEV-DO, HRPD, eHRPD, etc.), LTE, LTE-A, WLAN, or GNSS. Other combinations of wireless communication standards are also possible.

The UE 106 may include one or more antennas for communicating using one or more wireless communication protocols. Within the UE 106, one or more parts of a receive and/or transmit chain may be shared between multiple wireless communication standards; for example, the UE 106 might be configured to communicate using either (or both) of GSM or LTE using a single shared radio. The shared radio may include a single antenna, or may include multiple antennas (e.g., for MIMO or beamforming) for performing wireless communications. MIMO is an acronym for Multi-Input Multiple-Output.

Figure 4:
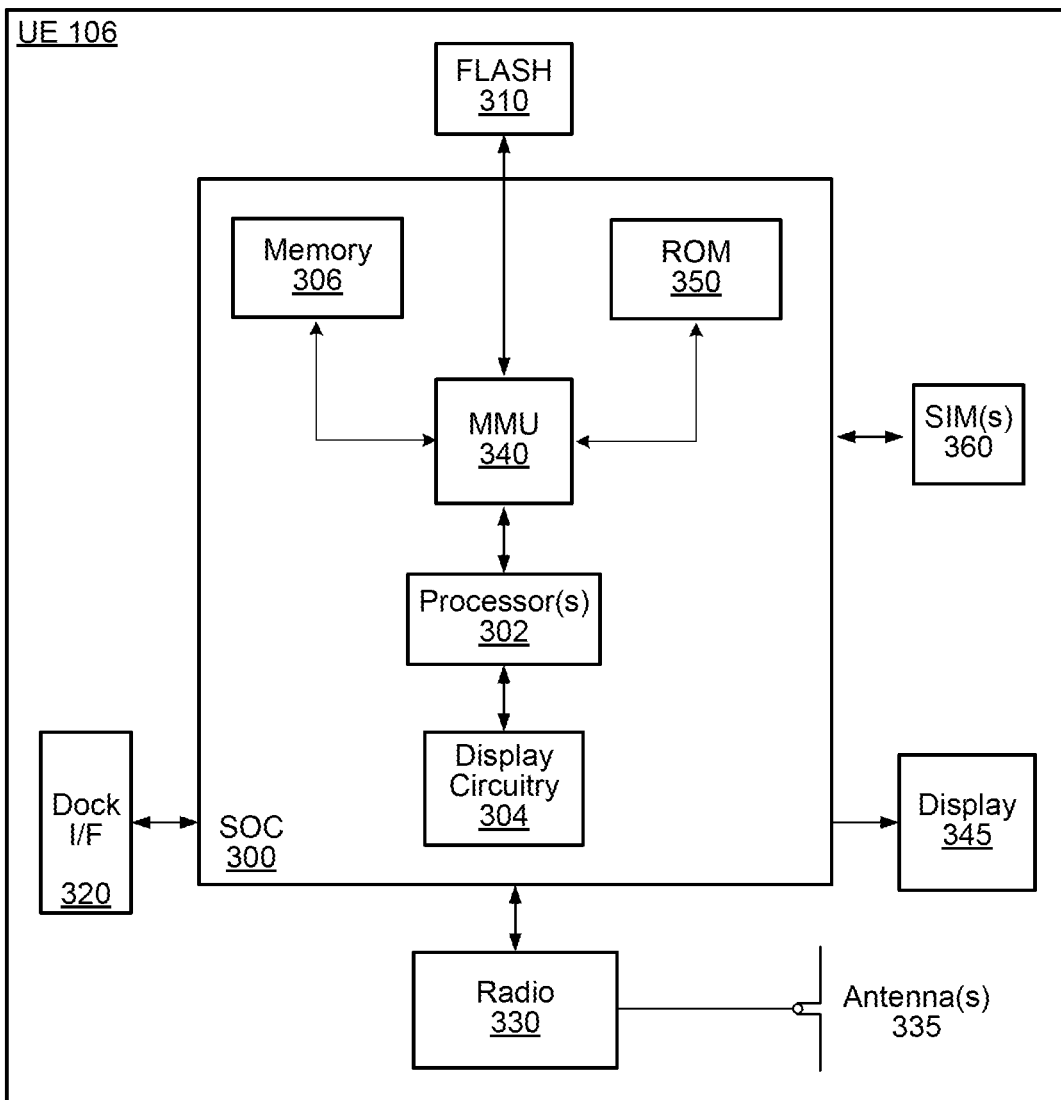
FIG. 4 illustrates an example of a block diagram of a user equipment device, according to some embodiments.

FIG. 4—Example of Block Diagram of a UE

FIG. 4 illustrates an example of a block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including Flash memory 310), a connector interface 320 (e.g., for coupling to a computer system, dock, charging station, etc.), the display 345, and radio 330.

The radio 330 may include one or more RF chains. Each RF chain may include a transmit chain, a receive chain, or both. For example, radio 330 may include two RF chains to support dual connectivity with two base stations (or two cells). The radio may be configured to support wireless communication according to one or more wireless communication standards, e.g., one or more of GSM, UMTS, LTE, LTE-A, WCDMA, CDMA2000, Bluetooth, Wi-Fi, GPS, etc.

The radio 330 couples to antenna subsystem 335, which includes one or more antennas. For example, the antenna subsystem 335 may include a plurality of antennas to support applications such as dual connectivity or MIMO or beamforming. The antenna subsystem 335 transmits and receives radio signals to/from one or more base stations or devices through the radio propagation medium, which is typically the atmosphere.

In some embodiments, the processor(s) 302 may include a baseband processor to generate uplink baseband signals and/or to process downlink baseband signals. The processor(s) 302 may be configured to perform data processing according to one or more wireless telecommunication standards, e.g., one or more of GSM, UMTS, LTE, LTE-A, WCDMA, CDMA2000, Bluetooth, Wi-Fi, GPS, etc.

The UE 106 may also include one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more sensors, one or more buttons, sliders, and/or dials, and/or any of various other elements capable of providing information to a user and/or receiving/interpreting user input.

As shown, the UE 106 may also include one or more subscriber identity modules (SIMs) 360. Each of the one or more SIMs may be implemented as an embedded SIM (eSIM), in which case the SIM may be implemented in device hardware and/or software. For example, in some embodiments, the UE 106 may include an embedded UICC (eUICC), e.g., a device which is built into the UE 106 and is not removable. The eUICC may be programmable, such that one or more eSIMs may be implemented on the eUICC. In other embodiments, the eSIM may be installed in UE 106 software, e.g., as program instructions stored on a memory medium (such as memory 306 or Flash 310) executing on a processor (such as processor 302) in the UE 106. As one example, a SIM 360 may be an application which executes on a Universal Integrated Circuit Card (UICC). Alternatively, or in addition, one or more of the SIMs 360 may be implemented as removeable SIM cards.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as or include: a programmable hardware element, such as an FPGA (Field Programmable Gate Array); or an ASIC (Application Specific Integrated Circuit); or a combination thereof.

Figure 5:
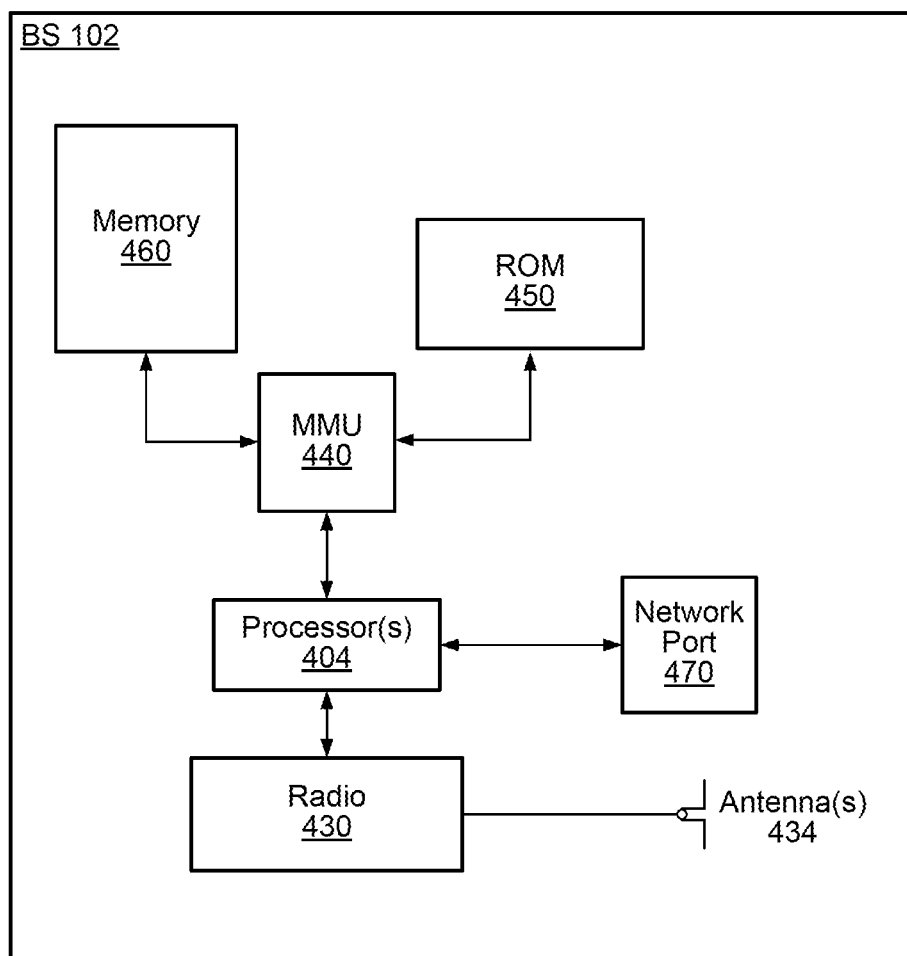
FIG. 5 illustrates an example of a block diagram of a base station, according to some embodiments.

FIG. 5—Example of a Base Station

FIG. 5 illustrates a block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory ROM 450) or to other circuits or devices.

The base station 102 may include at least one network port 470. The network port 470 may be configured to couple to a telephone network and provide access (for a plurality of devices, such as UE devices 106) to the telephone network, as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430 having one or more RF chains. Each RF chain may include a transmit chain, a receive chain, or both. (For example, the base station 102 may include at least one RF chain per sector or cell.) The radio 430 couples to antenna subsystem 434, which includes one or more antennas. Multiple antennas would be needed, e.g., to support applications such as MIMO or beamforming. The antenna subsystem 434 transmits and receives radio signals to/from UEs through the radio propagation medium (typically the atmosphere).

In some embodiments, the processor(s) 404 may include a baseband processor to generate downlink baseband signals and/or to process uplink baseband signals. The baseband processor 430 may be configured to operate according to one or more wireless telecommunication standards, including, but not limited to, GSM, LTE, WCDMA, CDMA2000, etc.

The processor(s) 404 of the base station 102 may be configured to implement part or all of the methods described herein, e.g., by executing program instructions stored on a memory medium (e.g., a non-transitory computer-readable memory medium). In some embodiments, the processor(s) 404 may include: a programmable hardware element, such as an FPGA (Field Programmable Gate Array); or an ASIC (Application Specific Integrated Circuit); or a combination thereof.

Figure 6:
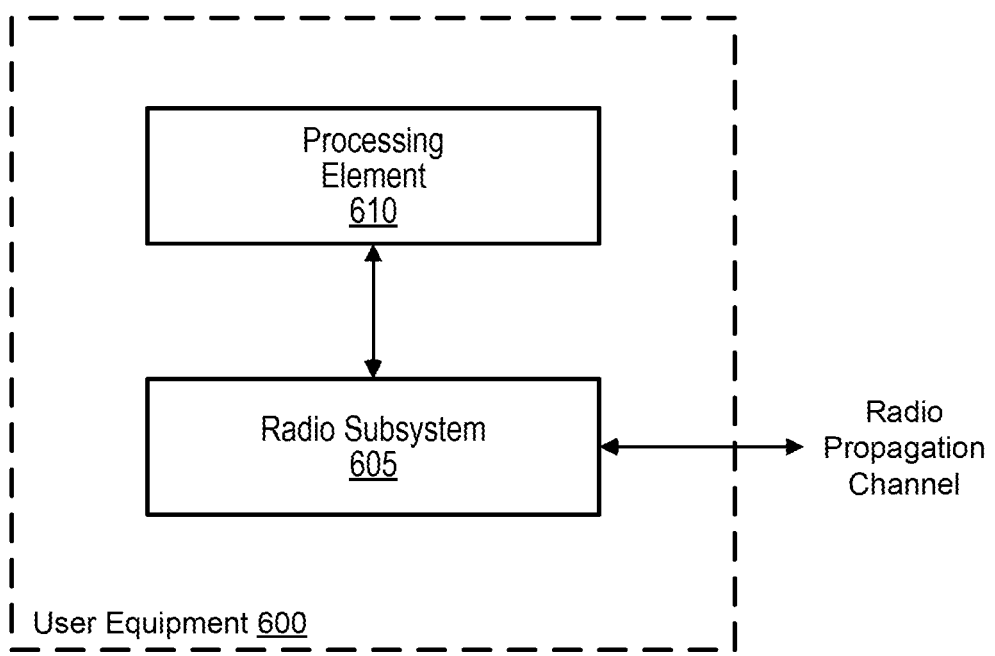
FIG. 6 illustrates an example of a user equipment 600, according to some embodiments.

In some embodiments, a wireless user equipment (UE) device 600 may be configured as shown in FIG. 6. UE device 600 may include: a radio subsystem 605 for performing wireless communication; and a processing element 610 operatively coupled to the radio subsystem. (UE device 600 may also include any subset of the UE features described above, e.g., in connection with FIGS. 1-4.)

The radio subsystem 605 may include one or more RF chains, e.g., as variously described above. Each RF chain may be configured to receive signals from the radio propagation channel and/or transmit signals onto the radio propagation channel. Thus, each RF chain may include a transmit chain and/or a receive chain. The radio subsystem 605 may be coupled to one or more antennas (or arrays of antennas) to facilitate signal transmission and reception. Each RF chain (or, some of the RF chains) may be tunable to a desired frequency, thus allowing the RF chain to receive or transmit at different frequencies at different times.

The processing element 610 may be coupled to the radio subsystem, and may be configured as variously described above. (For example, processing element may be realized by processor(s) 302.) The processing element may be configured to control the state of each RF chain in the radio subsystem.

In some embodiments, the processing element may include one or more baseband processors to (a) generate baseband signals to be transmitted by the radio subsystem and/or (b) process baseband signals provided by the radio subsystem.

In a dual connectivity mode of operation, the processing element may direct a first RF chain to communicate with a first base station using a first radio access technology and direct a second RF chain to communicate with a second base station using a second radio access technology. For example, the first RF chain may communicate with an LTE eNB, and the second RF chain may communicate with a gNB of 5G New Radio (NR). The link with the LTE eNB may be referred to as the LTE branch. The link with the gNB may be referred to as the NR branch. In some embodiments, the processing element may include a first subcircuit for baseband processing with respect to the LTE branch and a second subcircuit for baseband processing with respect to the NR branch.

The processing element 610 may be further configured as variously described in the sections below.

Figure 7:
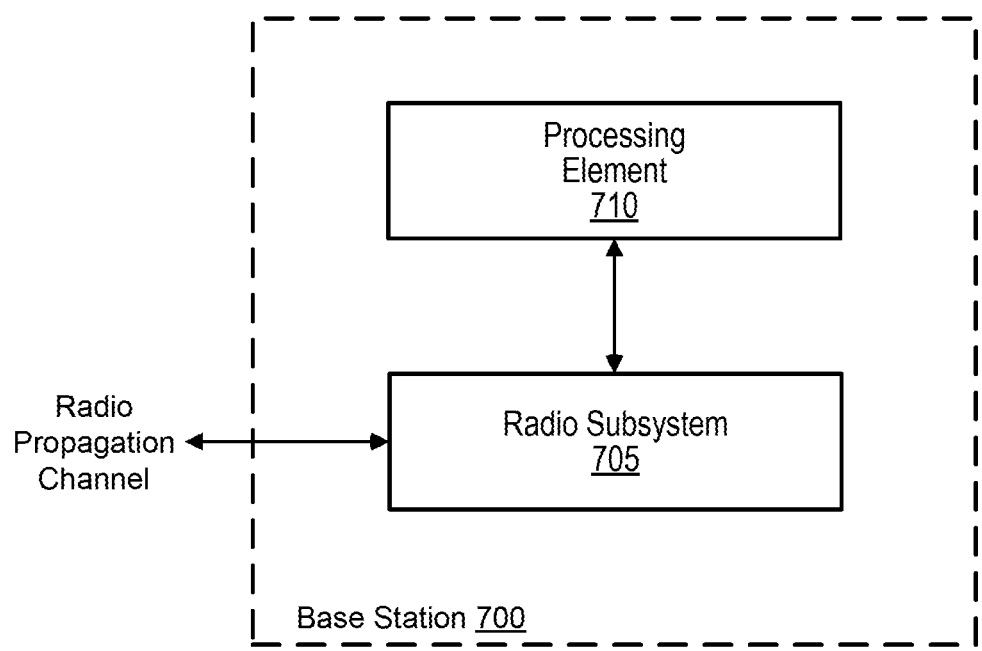
FIG. 7 illustrates an example of a base station 700, according to some embodiments. The base station 700 may be used to communicate with user equipment 600 of FIG. 6.

In some embodiments, a wireless base station 700 of a wireless network (not shown) may be configured as shown in FIG. 7. The wireless base station may include: a radio subsystem 705 for performing wireless communication over a radio propagation channel; and a processing element 710 operatively coupled to the radio subsystem. (The wireless base station may also include any subset of the base station features described above, e.g., the features described above in connection with FIG. 5.)

The radio subsystem 710 may include one or more RF chains. Each RF chain may be tunable to a desired frequency, thus allowing the RF chain to receive or transmit at different frequencies at different times.

The processing element 710 may be realized as variously described above. For example, in one embodiment, processing element 710 may be realized by processor(s) 404. In some embodiments, the processing element may include one or more baseband processors to: (a) generate baseband signals to be transmitted by the radio subsystem, and/or, (b) process baseband signals provided by the radio subsystem.

The processing element 710 may be configured to perform any of the base station method embodiments described herein.

In some embodiments, for the non-standalone (NSA) scenario with EN-DC setup, an LTE cell may instruct the user equipment (UE) to add and activate a New Radio (NR) branch when a B1 measurement report (based on the UE's observation) is received from the UE. EN-DC is an acronym for E-UTRAN New Radio-Dual Connectivity.

In some embodiments, the NR branch in the NSA scenario may stay active until the LTE branch moves to the RRC idle state; even when there is no data flow present, the NR branch may remain configured; the NR branch may not include the capability for Connected Mode Discontinuous Reception (CDRX). From the point of view of power consumption, keeping the NR branch active with sporadic data flow or no data flow is not efficient in the NSA scenario.

While the NR branch is active, the UE may perform a number of power consuming activities on the NR branch, e.g., activities such as the following. The UE conducts RRM measurements and reports periodic feedback of channel state information (CSI), e.g., feedback of SSB resource index and CSI resource index. (RRM is an acronym for Radio Resource Management. SSB is an acronym for Synchronization Signal Block.) The UE decodes the Physical Downlink Control Channel (PDCCH) with CORESET/search space configured. The UE performs periodic beam tracking and management, to maintain the link and/or mobility. Even if a long CDRX were configured on the NR branch, the UE may still need to wake up for beam tracking during the CDRX off period, to deal with UE rotation or movement. Thus, a policy of keeping the NR branch active even when data flow is small or sporadic may cause unnecessary battery waste and have a thermal impact on circuitry of the UE. Therefore, it may be desirable for the UE to be able to request or suggest de-configuration (or RRC state change) of the NR branch.

In some embodiments, the UE may be capable of performing connected mode discontinuous reception (CDRX) only on the LTE branch, not on the NR branch. In other embodiments, both the LTE branch and the NR branch are capable of performing CDRX, e.g., with the same or different DRX cycle values.

In some embodiments, the network may configure the NR branch of the UE to issue an event B1 report when the UE measures the NR serving cell at greater than −105 dBm. Once configured, the NR branch may remain active until the RF condition on the NR branch becomes very poor (e.g., approximately −120 dBm). Thus, it would be advantageous for the UE to be able to request removal or deactivation of the NR branch even when the RF condition is adequate, e.g., when user data flow is slow or sporadic.

In some embodiments, the UE may be configured to perform carrier aggregation (CA) on the NR branch. For example, 4 CA is one of the specified modes allowed in the 5G New Radio specifications. (4 CA involves the aggregation of four component carriers.) While the NR branch is active, the UE may report (e.g., periodically report) the quality of synchronization signal block (SSB) and CSI reference signals for all four of the CA carriers on the NR branch. Similar observations may hold for other modes of carrier aggregation, e.g., having different numbers of component carriers.

Therefore, if an NSA-capable UE is not equipped with a mechanism for requesting deactivation of the NR branch (or, of requesting the reduction of activity on the NR branch), it may consume significantly more power than an LTE-only UE when both are accessing bursty traffic, with no significant gains in performance.

UE Autonomous NR Activation/Deactivation for Power Saving in EN-DC

Figure 8A:
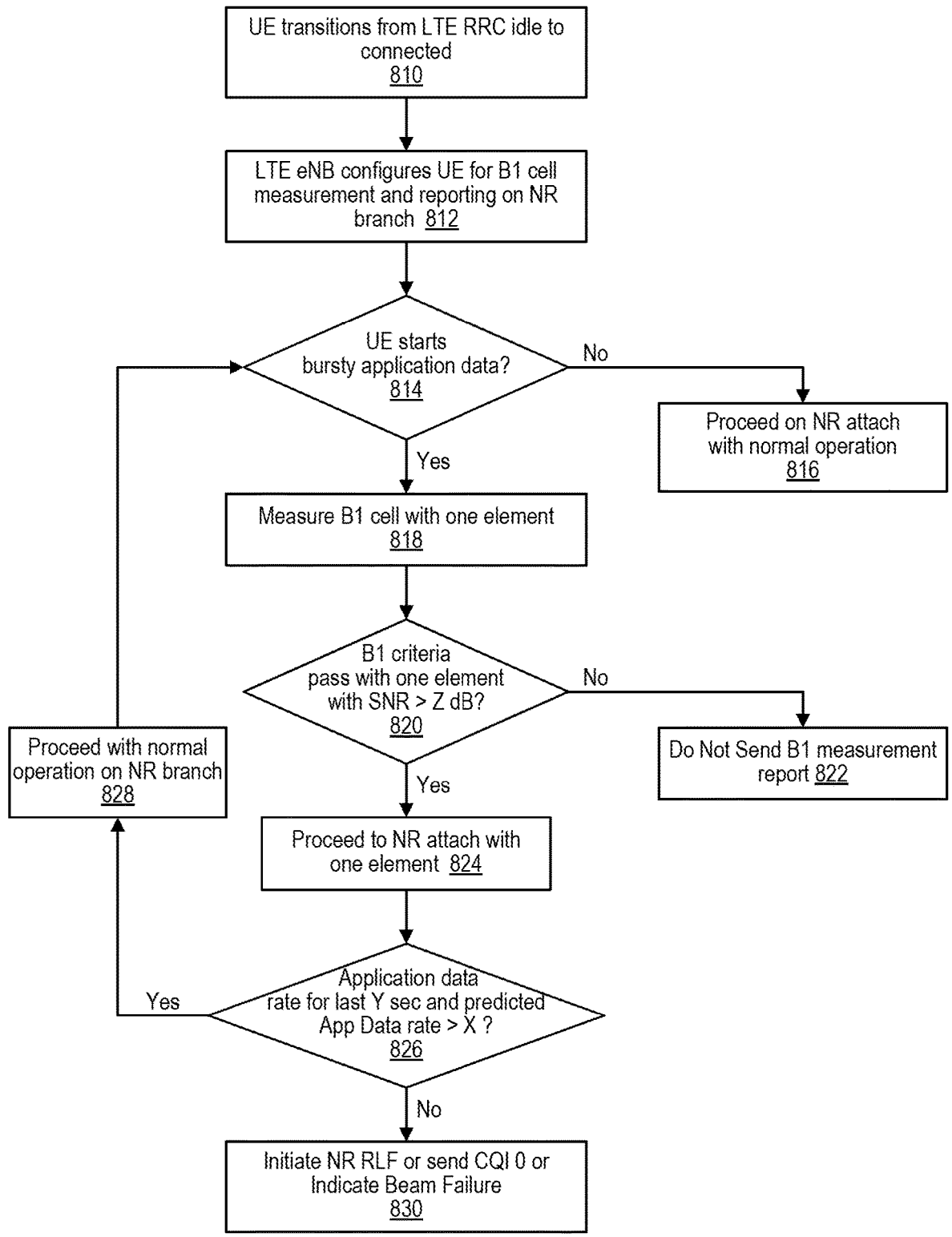
FIGS. 8A and 8B illustrates examples of methods enabling a user equipment to autonomously deactivate and/or activate a NR branch of communications (e.g., for power savings in a dual connectivity mode), according to some embodiments.

In some embodiments, for better utilization of the New Radio (NR) branch in EN-DC mode, the user equipment (UE) may send event B1 report only when signal condition on the NR branch are sufficiently good and traffic on the NR branch is sufficiently high. (EN-DC is an acronym for E-UTRAN New Radio—Dual Connectivity.) This is a novel use of the event B1 report. The event B1 report according to 3GPP Technical Specification 38.331 (NR, Radio Resource Control (RRC), Protocol specification) only considers the measurement delta between LTE and NR serving cells. See the embodiment of FIG. 8A, which may be useful, e.g., when the UE is executing applications that communicate in bursts of data such as a messaging service, or when using an application that requires less than X MBPS of data rate. The value X may be empirically or analytically derived value. (MBPS is an acronym for Megabits per second.)

At 810, the UE may transition from LTE RRC idle state to connected state, e.g., for an application executing on the UE device.

At 812, the LTE eNB may send a configuration message directing the UE to configure for NR cell measurement and reporting according to a B1 event.

At 814, the UE may determine whether a burst oriented application (or an application that is known or has been measured to have a data rate of less than X) has started. If so, the UE may proceed to 818. If not, the UE may proceed with attaching to the NR gNB using normal operation, i.e., operation according to existing 5G NR specifications, as shown at 816.

At 818, the UE may measure the B1-configured NR cell using one antenna element (or fewer antenna elements) of the UE.

At 820, the UE may determine if the B1 event criteria is satisfied with one antenna element and with SNR greater than Z dB. (Z denotes the SNR threshold for the B1 event. SNR is an acronym for signal to noise ratio.) If so, the UE may proceed to 824. If not, the UE may disable transmission of a B1 measurement report relating to the measured cell, as indicated at 822.

At 824, the UE may proceed with attaching to the NR gNB with one antenna element.

At 826, the UE may determine if the application data rate $R_Y$ for the last Y seconds, or the predicted application data rate $R_P$, or a combination thereof, is greater than a data rate threshold X. (For example, the minimum of $R_Y$ and $R_P$ may be required to be greater than X.) If so, the UE may proceed with NR data transmission and/or reception according to normal operation, i.e., operation according to existing 5G NR technical specifications, as shown at 828. If not, the UE may proceed to 830.

At 830, the UE may transmit to the network (e.g., to the eNB or to the gNB) information that will result in deactivation of the NR branch. For example, the UE may initiate NR radio link failure (RLF). As an alternative, the UE may send CQI 0. As another alternative, the UE may indicate beam failure on the measured NR cell.

In some embodiments, when long DRX (Discontinuous Reception Cycle) on the LTE branch is activated and there is no scheduling on the NR branch, UE may disable narrow beams on NR Frequency Range 2 (FR2) by reducing the number of active antenna elements, to save unnecessary power consumption on the NR branch before getting deactivated by network (NW). The reduction in active element number also helps to reduce the beam manager effort due to fewer beams available. UE may also attempt to send CQI 0, or beam failure report, or Radio Link Failure (RLF) report on NR branch back to gNB in an attempt to stop the NR branch. (CQI is an acronym for Channel Quality Indicator. RLF is an acronym for Radio Link Failure.)

Figure 8B:
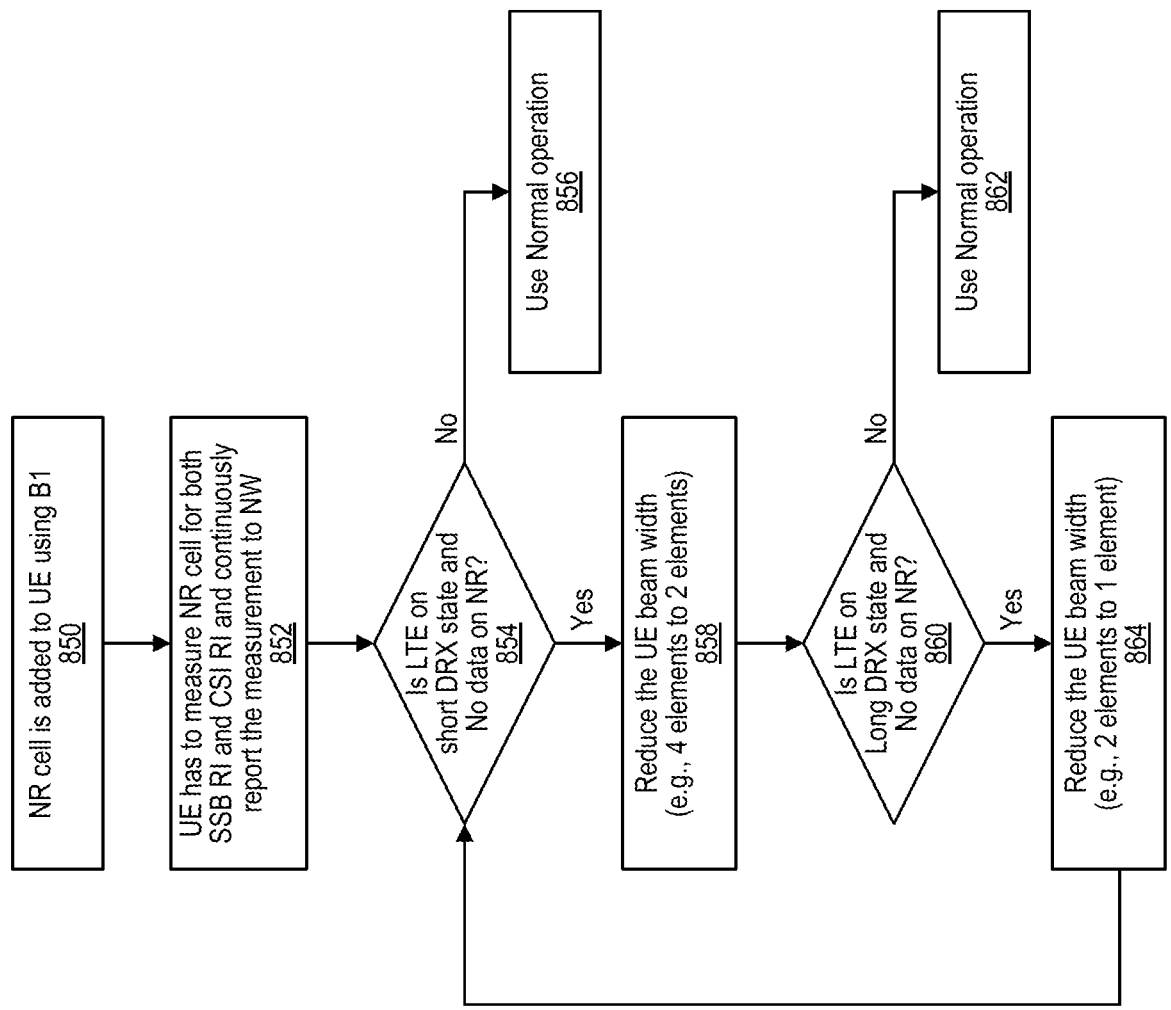

In some embodiments, the UE may be configured to perform the method of FIG. 8B.

At 850, an NR cell may be added to the UE using a B1 event report.

At 852, the UE may measure the NR cell for both Synchronization Signal Block Resource Index (SSB RI) and Channel State Information—Resource Index (CSI RI), and reports the measurement to the network, e.g., continuously or periodically.

At 854, the UE may determine if the LTE branch is configured for a short DRX state and there is no data (or too little data) activity on the NR branch. If not, at 856, the UE may use normal operation, i.e., operation according to existing 5G NR specifications, to communicate with the NR branch. If so, the UE proceeds to 858.

At 858, the UE may reduce the UE beam to a wider beam (e.g., 4 elements to 2 elements).

At 860, the UE may determine if the LTE branch is in a long DRX state (as opposed to a short DRX state) and the NR branch has no (or not sufficiently large) data flow. If not, the UE perform normal operations, i.e., operation according to existing 5G NR specification, to communicate with the NR branch. If so, the UE may proceed to 864.

At 864, the UE may reduce the UE beam to an even wider beam (e.g., 2 elements to 1 element). The UE may then return to 854.

In some embodiments, if the LTE MCG link is in the short DRX or long DRX, it may be understood that the UE device is attempting to release the bearers and no data is actively flowing.

UE Initiated NR Branch Disconnection/Suspension/Reconfiguration

In some embodiments, to improve the power efficiency for NSA (Non-Standalone), in addition to tweaking the event B1 report at UE, e.g., when adding/activating NR, the capability of UE to initiate NR branch disconnection/suspension may also be required or desired.

In some embodiments, for better UE power efficiency, UE may be able to request that NR branch to be shut down. If UE is seeing low uplink data and expecting low/none downlink data based on application data flow, UE may send a request through RRC (Radio Resource Control) or MAC-CE (Medium Access Control—Control Element) to shut down the NR branch in NSA/EN-DC. Such a request can be based on whether the (uplink and/or downlink) scheduling rate is less than a certain threshold, where the traffic threshold is determined based on UE power.

Purely relying on buffer status report might not be sufficient since it cannot reflect the data flow in the application layer.

The following are methods to resume (re-activate) the NR branch, according to some embodiments.

A. When uplink data increases, UE may simply perform random access (RACH) on the same NR cell and/or send event B1 again.

B. If MCG (Master Cell Group) is observing DL data coming to UE, it can send RRC reconfiguration with event B1 report again, probably with lower threshold so that it can see UE's measurement on NR, and further decide to activate NR immediately or not. The NW may directly activate SCG (Secondary Cell Group) for data transmission from Master Cell Group (MCG).

C. If LTE branch goes into RRC idle state or changes the serving cell, the whole procedure may start as usual, i.e., based on UE event B1 report to add NR.

UE Initiates Deactivation or Suspension of the New Radio Branch

Based on UE's expected data amount and/or traffic rate depending on application data flow, UE can send a request to deactivate/suspend NR branch/SCG. In SCG deactivated state, all SCG SCells are deactivated state while SCG Primary Cell (PCell) may perform one or more of the following: keep on performing measurement/beam tracking but with long cycle; perform no PDSCH/PUSCH transmission; optionally keep performing CQI/SRS report with long cycle; optionally monitor PDCCH and RLM measurement. (PDSCH is an acronym for Physical Downlink Shared Channel. PUSCH is an acronym for Physical Uplink Shared Channel. SRS is an acronym for sounding reference signal.) When SCG is activated, only SCG PCell is activated, while SCG SCells remain in deactivated state. Deactivation and/or activation of SCG may be done in an explicit way (e.g., NW explicit activation/deactivation command), or an implicit way (e.g., timing or timer based), or an autonomous way based on pre-configured conditions (e.g., data amount/traffic rate threshold).

Methods to wake up the NR branch may include the following.

A. For MO wakeup, UE may simply RACH/SR on the same NR cell. (MO is an acronym for Mobile Originated.)

B. MT wakeup may be done through LTE/MCG in NSA/EN-DC setup. NW may indicate UE to wakeup NR-branch/SCG via LTE branch or MCG. UE may activate SCG directly, and enter DRX-on state on SCG PCell. (MT is an acronym for Mobile Terminated.)

Figure 9:
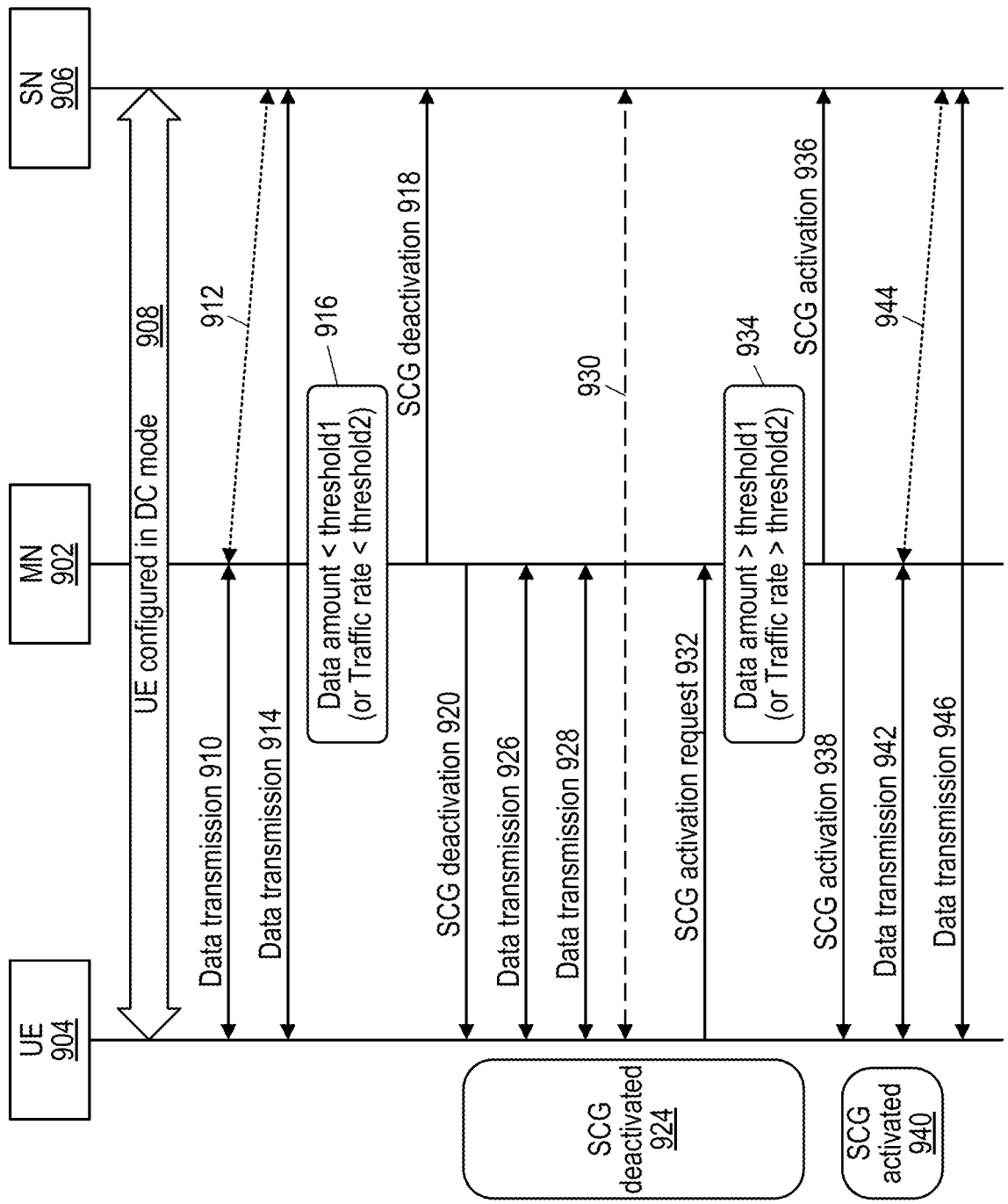
FIG. 9 illustrates an example of a method for deactivating and/or activating a secondary cell group (SCG) via a master node in a dual connectivity scenario, according to some embodiments.

FIG. 9 illustrates an example of SCG deactivation and reactivation via a master node (MN) 902, according to some embodiments.

A UE 902 is configured for dual connectivity with the MN and a secondary node (SN) 906, as shown at 908. The UE engages in data transmission 910 (uplink and/or downlink) with MN. (The MN may forward data targeted for the UE to the SN, as shown at 912.) The UE may also engage in data transmission 914 (uplink and/or downlink) with the SN.

As shown at 916, the decision whether to deactivate the secondary cell group (SCG) may be performed at the MN 902, and may be based on a data amount comparison or a comparison of expected traffic rate, e.g., depending on App type. For example, the MN may deactivate the SCG if the data amount is less than a first threshold (or, if the traffic rate is less than a second threshold). (The term "data amount" refers to an amount of data that has been or will be transferred between the UE and SN. Similarly, the term "traffic rate" refers to the rate of traffic that has been or will be transferred between the UE and SN.) If the above condition is satisfied, the MN may send an SCG deactivate command 918 to the SN 906, and send an SCG deactivate command 920 to the UE.

In response to receiving the deactivate command 918, the SN 906 may deactivate the context of the UE at the SN.

In response to receiving the deactivate command 920, the UE may enter the SCG deactivated state 924, wherein UE activity relative to the secondary cells of the secondary cell group (SCG) hosted by the SN is terminated while activity relating to the primary cell of the SCG is allowed to persist, as suggested by the dashed arrow 930. (In some embodiments, the activity of the primary cell may be reduced, to further conserve power.) Data transmissions with respect to MN may continue without interruption, e.g., as illustrated by data transmissions 926 and 928.

In some embodiments, in the deactivated state, UE is not required to perform the following operations on the primary cell (PCell) of the SCG: monitor Physical Downlink Control Channel (PDCCH); transmit SRS or CSI report; perform RLM; transmit scheduling request (SR); or perform random access (RACH). (CSI is an acronym for channel state information. RLM is an acronym for Radio Link Monitoring.)

In response to determining that uplink data is available for transmission to the SN (e.g., if SCG DRB data available), the UE may transmit an SCG activation request 932 to MN. The request may include the available data amount for transmission to the SCG. (DRB is an acronym for Data Radio Bearer.)

In response to receiving the SCG activation request, the MN may determine if the data amount is greater than the first threshold (or, if the traffic rate is greater than the second threshold). If so, the MN may send an SCG activation message 936 to the SN and send an SCG activation message 938 to the UE.

In response to receiving the SCG activation message 940, the UE may enter an SCG activated state 940, wherein activity (e.g., baseband processing activity and RF activity) relative to secondary cells of the SCG is restored or enabled, as suggested by the data transmission 946. Data transmission 946 may include transmissions on the primary cell and one or more secondary cells of the SCG. The dotted arrow 944 implies that data targeted for the UE may be forwarded from the MN to the SN. (Data transmission 942 is an example of data transmission with respect to the MN in the SCG activated state.)

Figure 10:
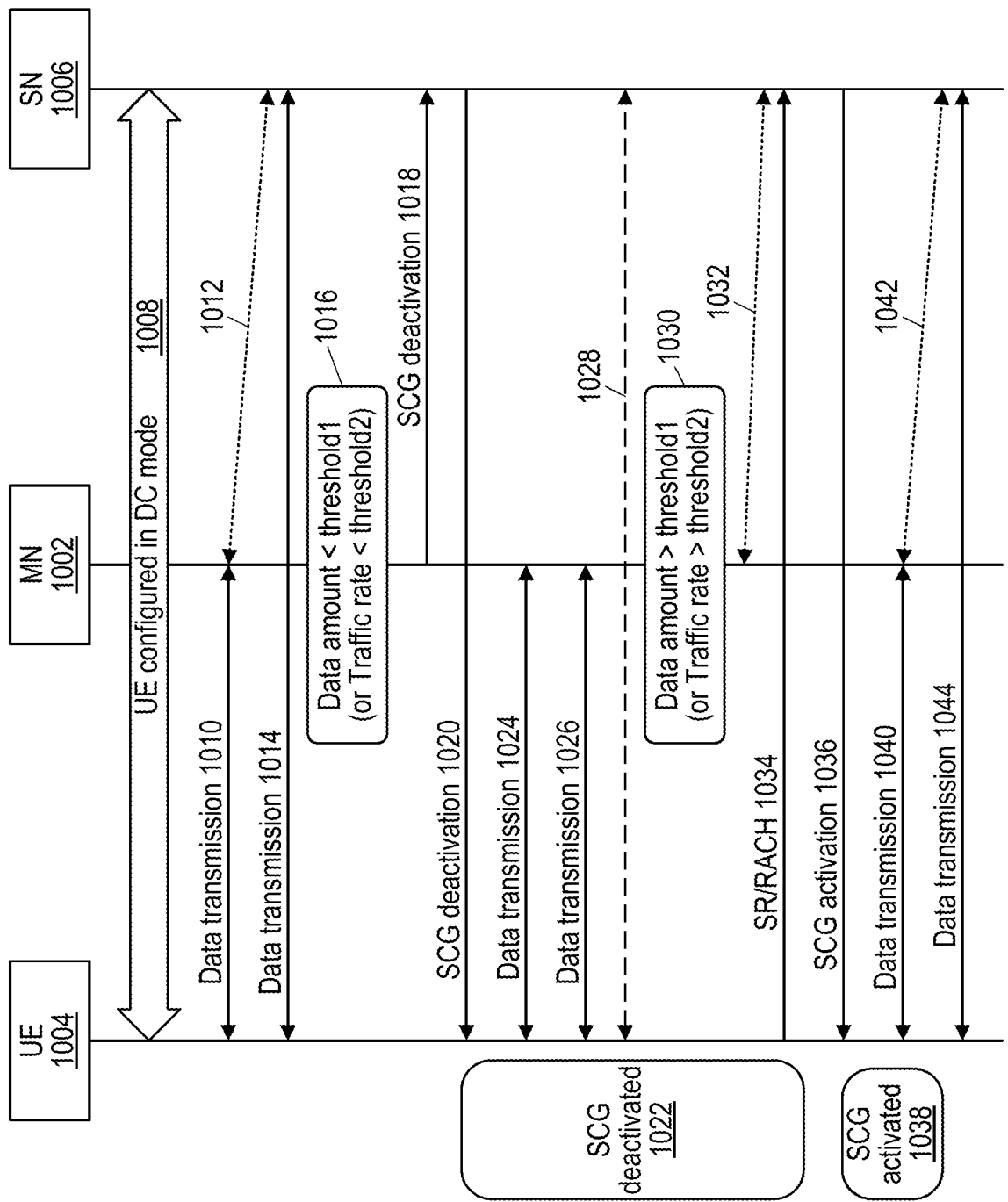
FIG. 10 illustrates an example of a method for deactivating and/or activating a secondary cell group via a secondary node in a dual connectivity scenario, according to some embodiments.

FIG. 10 illustrates a method of SCG deactivation and reactivation via a secondary node (SN) 1006, according to some embodiments. A UE 1004 may be configured in a dual connectivity (DC) mode with a master node (MN) 1002 and a secondary node (SN) 1006, as shown at 1008. The UE engages in data transmission 1010 (uplink and/or downlink) with MN. Furthermore, the MN may forward data targeted for the UE to the SN, as shown at 1012.

The SN may also engage in data transmission 1014 with the UE.

As shown at 1016, the decision whether to deactivate the secondary cell group (SCG) may be performed at the MN, and may be based on a data amount comparison or a comparison of expected traffic rate, e.g., depending on App type. For example, the MN may deactivate the SCG if the data amount is less than a first threshold (or, if the traffic rate is less than a second threshold). (The data amount may be a DL data amount or an UL data amount. DL data amount may be based on the data amount stored in a DL buffer for the UE. The UL data amount may be based on UE reported BSR. BSR stands for Buffer Status Report.) If the above condition is satisfied, the MN may send an SCG deactivate command 1018 to the SN. In response to receiving the deactivate command 1018, the SN may an SCG deactivate command 1020 to the UE.

In response to receiving the SCG deactivate command 1020, the UE may enter the SCG deactivated state 1022. In the SCG deactivated state 1022, secondary cells of the secondary node may be deactivated. Furthermore, in the SCG deactivated state, the UE is not required to perform the following operations with respect to the primary cell (PCell) of the SCG: transmit sounding reference signals (SRSs); transmit channel state information (CSI) reports, perform radio link monitoring (RLM).

As shown at 1030, the MN may determine if a current data amount is greater than the first threshold (or, if traffic rate is greater than the second threshold). If this condition is satisfied, the MN may reactivate the SCG branch for the UE by paging the UE. The dotted line 1032 represents the possibility of forwarding data from MN to SN.

If the UE determines that UL data is available for transmission to the SN (e.g., if SCG DRB data available), the UE may assert a scheduling request (SR) to the SN by initiating a random access procedure (RACH) with respect to the SN, as suggested at 1034, and report (to the SN) the amount of the UL data as part of a buffer status report (BSR). In response to receiving the scheduling request, the SN may send an SCG activation command 1036 to the UE. In response to receiving the SCG activation command, the UE may enter the SCG activated state 1038, wherein activity of the secondary cells of the SCG is restored (or enabled).

In the SCG activated state 1038, data transmission 1044 with the primary and one or more secondary cells of the SCG may be performed. The dotted line 1042 represents the possibility of forwarding data from MN to SN when the SN-to-UE link is reactivated by MN, i.e., forwarding data targeted for the UE. (Data transmission 1040 is an example of data transmission with respect to the MN during the SCG activated state.)

Figure 11:
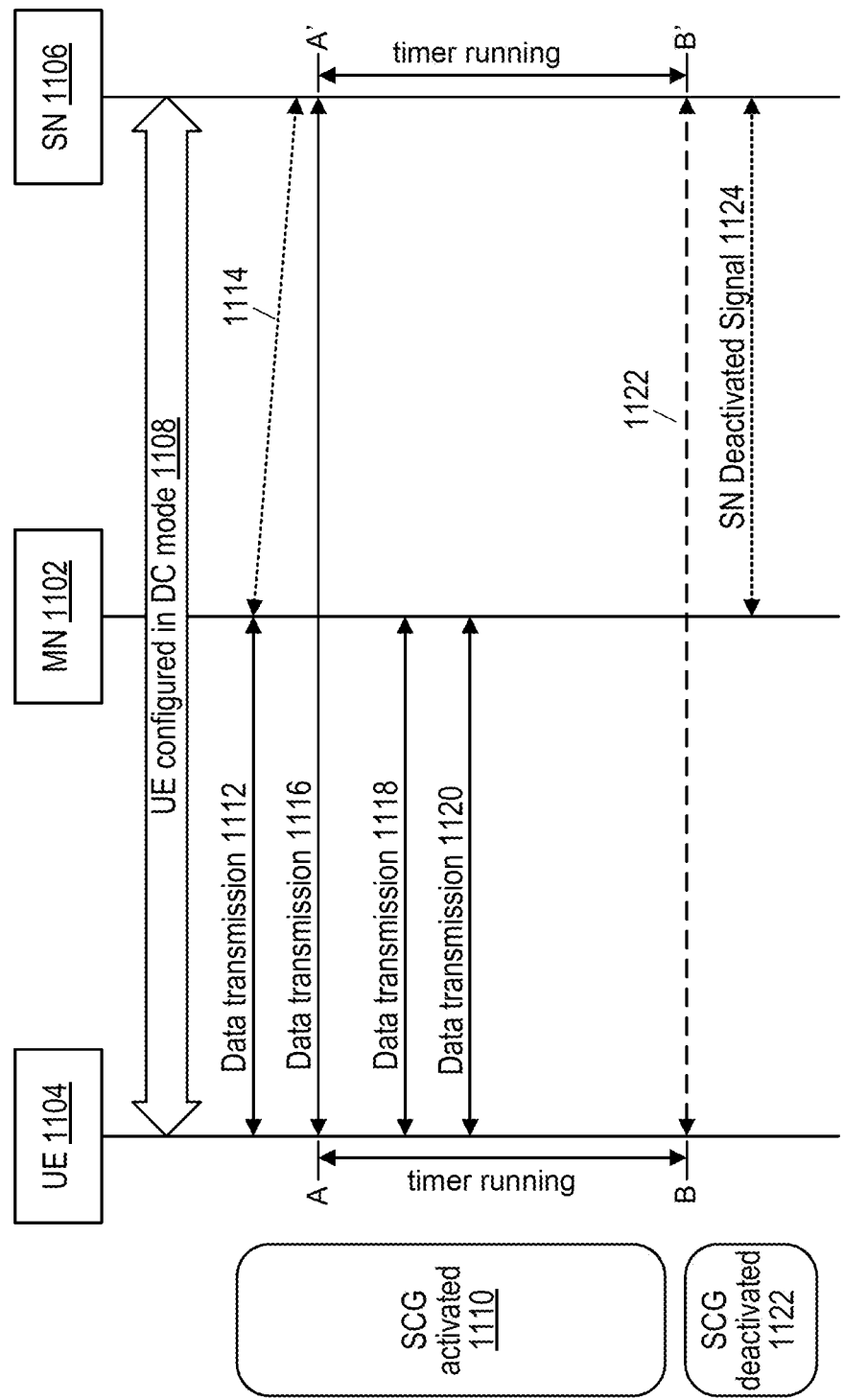
FIG. 11 illustrates an example of a method for implicitly deactivating a secondary cell group using a scheduling-based timer, according to some embodiments.

FIG. 11 illustrates an example of implicit deactivation of a secondary cell group (SCG) using a timer based on scheduling activity, according to some embodiments. The UE 1104 may be configured for a mode of dual connectivity (DC) with a master node MN 1102 and a secondary node SN 1106, as indicated at 1108. When the dual connectivity mode is initiated, the UE may enter an SCG activated state 1110.

In the SCG activated state 1110, the UE may engage in data transmissions such as data transmission 1112 with respect to the MN as well as data transmissions such as data transmission 1116 with respect to the SN. Data transmission 1116 may include transmission with respect to a primary cell of the SCG as well as transmission with respect to one or more secondary cells of the SCG. (The SCG is associated with the SN.)

In some embodiments, the MN may forward data 1114 intended for the UE to the SN. Thus, data transmission 1116 may include this forwarded data.

In the SCG activated state 1110, the UE may start (or restart) a timer, in response to receiving scheduling information (e.g., downlink scheduling information or uplink grant) from the SCG. (The starting of the timer is indicated by marker A.) The scheduling information specifies uplink resources granted to the UE for uplink transmission, or downlink resources that will carry downlink data for the UE. In the case illustrated, the scheduling information is received as part of data transmission 1116, and thus, the start of the timer coincides (at least approximately) to the time of reception of the data transmission 1116. While the timer is running, the UE may engage in data transmissions such as 1118 and 1120 with the MN.

The UE may enter the SCG deactivated state 1122 in response to expiration of the timer. (The expiration of the timer is indicated by marker B.) In the SCG deactivated state, the UE may deactivate (e.g., terminate activity with respect to) secondary cells of the SCG, and may reduce activity on the primary cell of the SCG, e.g., as variously described above. Communication with the SN in the deactivated state is indicated at 1122.

In some embodiments, the SN may similarly start (or restart) a timer in response to the transmission of scheduling information to the UE. For example, in response the transmission of scheduling information as part of data transmission 1116, the SN may start the timer, as indicated by marker A'. When the timer expires, as indicated by marker B', the SN may deactivate secondary cells of the SCG with respect to the UE, and signal the deactivated state of the SN to the MN, as indicated at 1124.

The initial value of the UE's timer and the initial value of the SN's timer may be configured to be equal, e.g., so that both timers will expire simultaneously (or approximately simultaneously).

Figure 12:
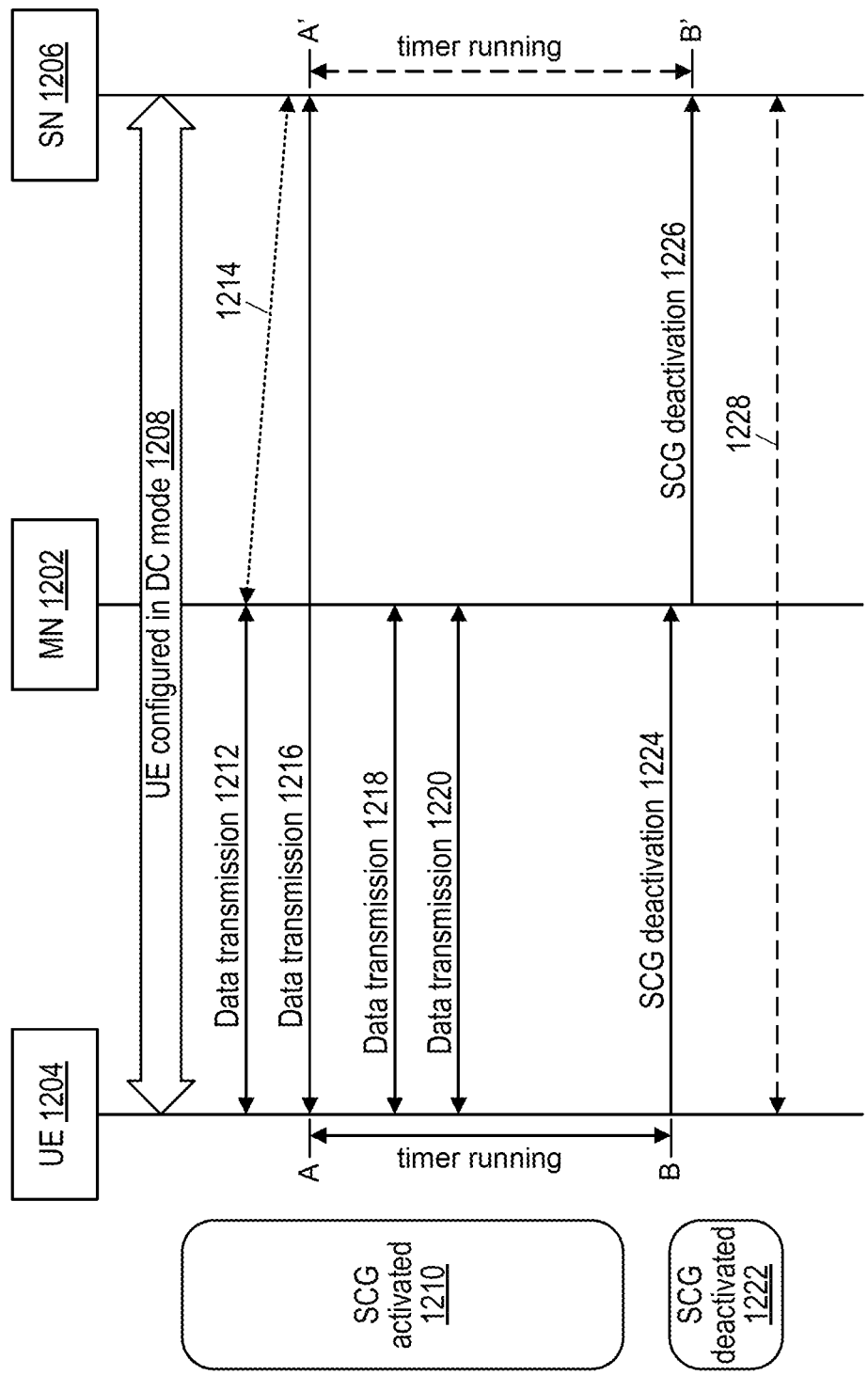
FIG. 12 illustrates an example of a method for implicitly deactivating a secondary cell group using a timer based on amount of data to be transmitted, according to some embodiments.

FIG. 12 illustrates an example of implicit deactivation of a secondary cell group (SCG) using a timer based on data amount, according to some embodiments. As indicated at 1208, a user equipment UE 1204 may be configured in a mode of dual connectivity with a master node MN 1202 and a secondary node 1206. In response to initiation of the dual connectivity mode, the UE may enter an SCG activated state 1210. While in the SCG activated state, the UE may engage in (e.g., receive and/or transmit) data transmissions with respect the SN (such as data transmission 1216) as well as data transmissions with respect to the MN (such as data transmissions 1212, 1218 and 1220).

In some embodiments, the SN may forward data intended for the UE to the SN, as shown at 1214. Thus, data transmission 1216 may include such forwarded data.

In response to determining that a data amount is less than an amount threshold (or, that a traffic rate is less than a traffic threshold), the UE may start an SCG deactivation timer. The data amount may be an amount of data received in a downlink transmission from the SG, or an amount of uplink data to be transmitted by the UE to the SN. In the case illustrated, the data amount is an amount of data related to the data transmission 1216, and thus, the start of the timer coincides (at least approximately) with the time of the data transmission 1216, as indicated by marker A.

If, while the timer is running, a subsequent data amount is greater than or equal to the amount threshold (or, the traffic rate changes to a value greater than or equal to the traffic threshold), the UE may stop the timer. (The subsequent data amount may be an amount of downlink data or an amount of uplink data.) If, while the timer is stopped, the data amount again becomes less than the amount threshold (or, the traffic rate again becomes less than the traffic threshold), the UE may restart the timer.

In response to expiration of the timer, the UE may enter the SCG deactivated state 1222, and inform the network (NW) that the deactivated state has been entered. In the SCG deactivated state 1222, the UE may deactivate (e.g., terminate activity with respect to) secondary cells of the SN and reduce activity with respect to the primary cell of the SN, e.g., as variously described above.

In one embodiment, the UE may inform the network by sending an SCG deactivation message 1224 to the MN. In response to receiving the SCG deactivation message 1224, the MN may send an SCG deactivation message 1226 to the SN. In response to receiving the SCG deactivation message 1226, the SN may deactivate the SCG secondary cells with respect to the UE.

In another embodiment, the UE may inform the network by sending an SCG deactivation message (now shown) directly to the SN.

In some embodiments, the SN may also maintain a timer, similarly based on data amount (or traffic rate) to and/or from the UE. (In these embodiments, the UE may not need to inform the network when it is entering the SCG deactivated state 1222 since the SN may already know, based on the expiration of the SN-implemented timer.) In response to determining that a data amount associated with the UE is less than an amount threshold (or, that a traffic rate associated with the UE is less than a traffic threshold), the SN may start a timer. The data amount may be an amount of data received in an uplink transmission from the UE, or an amount of downlink data to be transmitted by the SN to the UE. In the case illustrated, the data amount is an amount of data related to the data transmission 1216, and thus, the start of the timer coincides (at least approximately) with the time of the data transmission 1216, as indicated by marker A'. When the timer expires, as indicated by marker B', the SN may deactivate SCG secondary cells with respect to the UE.

Dashed arrow 1128 indicates a state of data communication between the UE and SN after the SN has deactivated the SCG secondary cells.

In some embodiments, instead of entering the SCG deactivated state 1222 immediately in response to determination that the data amount criterion (or the traffic rate criterion) has been satisfied, the UE may send a request for SCG activation to the network (e.g., to the MN or the SN), and wait for an acknowledge message from network. In these embodiments, the UE enters the SCG deactivated state 1222 in response to receiving the acknowledgement message.

Figure 13:
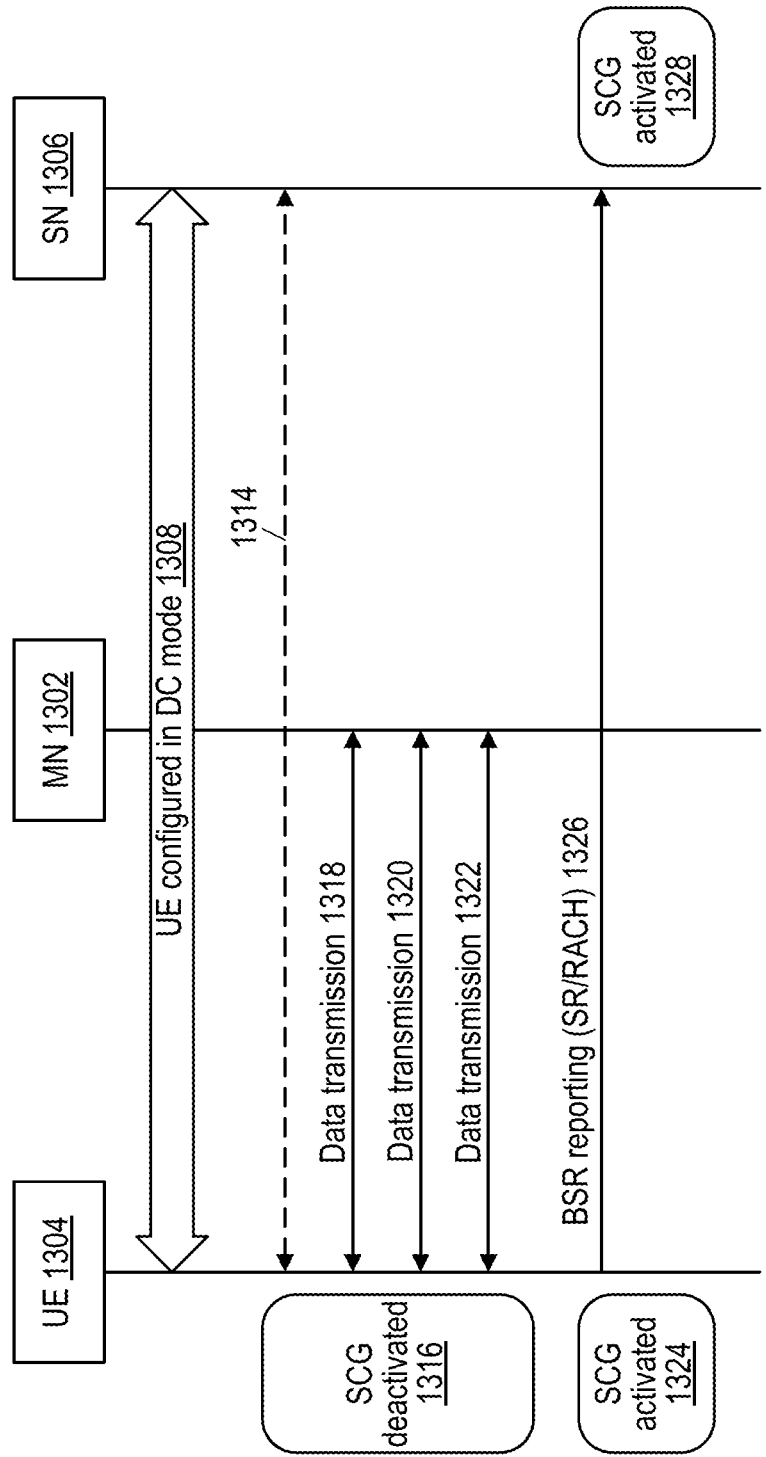
FIG. 13 illustrates an example of a method for implicitly activating a secondary cell group in response to availability of uplink data (to be transmitted by the user equipment), according to some embodiments.

FIG. 13 illustrates an example of implicit activation of the secondary cell group (SCG) based on SCG uplink (UL) data arrival, according to some embodiments. The user equipment UE 1304 may be configured in a mode of dual connectivity (DC) with a master node MN 1302 and a secondary node SN 1306, as indicated at 1308. The UE may enter an SCG deactivated state 1316, e.g., in response one or more conditions as variously described above.

In the SCG deactivated state 1316, secondary cells of the SCG are deactivated. On the SCG primary cell (PCell), the UE may perform discontinuous reception (DRX) with a longer DRX cycle value than in an SCG activated state, and based on that longer DRX cycle value, monitor a Physical Downlink Control Channel (PDCCH) of the PCell, transmit sounding reference signals (SRSs) on the PCell, transmit channel state information (CSI) reports on the PCell, and perform radio link monitoring (RLM) with respect to the PCell. The DRX configuration in the SCG deactivated state can be different from the DRX configuration in the SCG activated state.

In the SCG deactivated state 1316, the UE may engage in (e.g., receive and/or transmit) data transmissions such as data transmissions 1318, 1320 and 1322 with respect to the MN and data transmissions such as data transmission 1314 with respect to the SN.

In response to determining that uplink data is available for transmission to the SCG, the UE may trigger reporting of buffer status report (BSR), e.g., by initiating a random access procedure (RACH) and asserting a scheduling request (SR) as part of the random access procedure. In response to initiating RACH and asserting the scheduling request, the UE may enter the SCG activated state 1324.

In response to receiving the scheduling request SR from UE, the network (e.g., the SN) may enter the SCG activated state 1328 and schedule uplink resources for the UE on the SCG.

Figure 14:
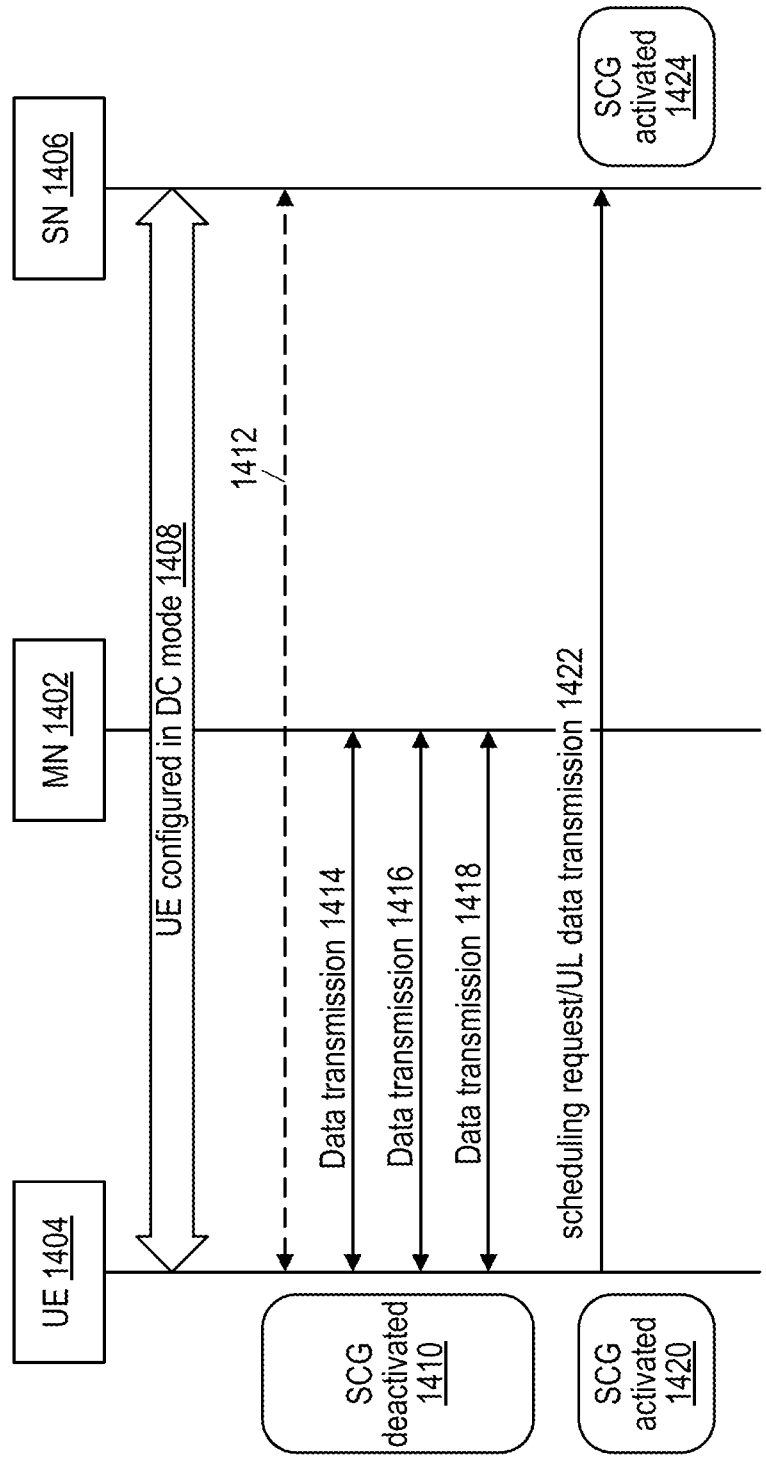
FIG. 14 illustrates an example of a method for implicitly activating a secondary cell group in response to determining that an amount of uplink data available for transmission by the user equipment is greater than a given threshold, according to some embodiments.

FIG. 14 illustrates an example of implicit activation of a secondary cell group (SCG) based on a threshold, according to some embodiments. The user equipment UE 1404 may be configured in a mode of dual connectivity (DC) with a master node MN 1402 and a secondary node SN 1406, as indicated at 1408. The UE may enter an SCG deactivated state 1410, e.g., in response one or more conditions as variously described above.

In the SCG deactivated state 1410, secondary cells of the SCG are deactivated. On the SCG primary cell (PCell), the UE may perform discontinuous reception (DRX) with a longer DRX cycle value than in an SCG activated state, and based on that longer DRX cycle value, monitor a Physical Downlink Control Channel (PDCCH) of the PCell, transmit sounding reference signals (SRSs) on the PCell, transmit channel state information (CSI) reports on the PCell, and perform radio link monitoring (RLM) with respect to the PCell. The DRX configuration in the SCG deactivated state can be different from the DRX configuration in the SCG activated state.

In the SCG deactivated state 1410, the UE may engage in (e.g., transmit and/or receive) data transmissions such as data transmissions 1414, 1416 and 1418 with respect to the MN and data transmissions such as data transmission 1412 with respect to the SN.

If, in the SCG deactivated state, the UE determines that an amount of uplink data available for transmission to the SN is greater than an amount threshold, the UE may activate the SCG directly, e.g., by transmitting a scheduling request to the SN. In response to receiving a grant of uplink resources from the SN, the UE may transmit (or start transmitting) the uplink data to the SN. The scheduling request and uplink data transmission as indicated at 1422.

As shown at 1420, in response to receiving the scheduling request from UE, the network (e.g., the SN) may enter an SCG activated state 1424. In the SCG activated state 1424, the SN may activate the SCG, and schedule uplink resources for the UE on the SCG.

In some embodiments, a method 1500 for operating wireless user equipment (UE) device may include the operation shown in FIG. 15. (The method 1500 may also include any subset of the elements, embodiments and features described above in connection with FIGS. 1-14.) The wireless UE device may be configured as variously described above, e.g., as described in connection with user equipment 600 of FIG. 6. The method 1500 may be performed by a processing element of the UE device.

As shown at 1510, while the wireless UE device is in a state of dual connectivity to a master node and a secondary node, the processing element may enter a mode wherein activity of the UE device with respect to the secondary node is reduced relative to activity with respect to a primary cell of the secondary node. (The term "activity" includes within its scope of meaning baseband processing activity and radio activity of the UE device.) The master node may correspond to a first radio access technology; and the secondary node may correspond to a second radio access technology different from the first radio access technology.

By reducing activity with respect to the secondary node, the UE device may conserve battery power when traffic rate to and/or from the secondary node is low. The method 1500 may be especially useful when UE device has been configured for carrier aggregation on the secondary node but traffic rate with respect to the secondary node is low.

In some embodiments, upon entering said mode, activity of the UE device relative to secondary cells of the secondary node may be terminated.

In some embodiments, upon entering said mode, the processing element may perform In some embodiments, upon entering said mode, the processing element may perform periodic cell measurement and reporting relative to the primary cell of the secondary node, but with a longer cycle than prior to entering said mode. Cell measurements may include measurements such as signal strength or signal quality or signal to interference-and-noise ratio (SINR), etc.

In some embodiments, upon entering said mode, the processing element may perform periodic beam tracking relative to the primary cell of the secondary node, but with longer cycle than prior to entering said mode;

In some embodiments, upon entering said mode, the processing element may perform periodic reporting of information regarding channel quality (e.g., CQI) relative to the primary cell of the secondary node, but with longer cycle than prior to entering said mode;

In some embodiments, upon entering said mode, the processing element may perform periodic transmissions of sounding reference signals (SRSs) to the primary cell of the secondary node, but with longer cycle than prior to entering said mode.

In some embodiments, upon entering said mode, the processing element may terminate monitoring of a Physical Downlink Shared Channel (PDSCH) of the primary cell of the secondary node.

In some embodiments, upon entering said mode, the processing element may terminate monitoring of a Physical Downlink Control Channel (PDCCH) of the primary cell of the secondary node.

In some embodiments, upon entering said mode, the processing element may disable transmission on a Physical Uplink Shared Channel (PUSCH) associated with the secondary node. For example, the processing element may disable uplink transmission on the PUSCH of a primary component carrier relative to the secondary node.

In some embodiments, upon entering said mode, the processing element may terminate measurements related to radio link monitoring (RLM) with respect to the secondary node.

In some embodiments, said mode is entered in response to a command from the master node or the secondary node. The command may be received in any of various ways, e.g., as part of a Radio Resource Control (RRC) message, or as part of a Medium Access Control-Control Element (MAC-CE), or as part of downlink control information (DCI).

In some embodiments, the processing element may start an inactivity timer in response to receiving uplink and/or downlink scheduling with respect to the secondary node. In response to receiving additional uplink and/or downlink scheduling with respect to the secondary node while the inactivity timer is running, the processing element may restart the inactivity timer. The processing element may enter said mode in response to expiration of the inactivity timer.

In some embodiments, the processing element may start a timer in response to determining that a traffic rate relating to data communication with the secondary node is less than a threshold. (The data communication may be uplink or downlink communication.) In response to determining that a subsequent traffic rate relating to data communication with the secondary node is greater than the threshold, the processing element may stop the timer. The processing element may enter said mode in response to expiration of the timer.

In some embodiments, the processing element may start a timer in response to determining that a first data amount relating to data communication with the secondary node is less than a threshold. In response to determining that a subsequent data amount relating to data communication with the secondary node is greater than the threshold, the processing element may stop the timer. The processing element may enter said mode in response to expiration of the timer.

In some embodiments, after having entered said mode, the processing element may transmit a scheduling request to the secondary node in response to determining that an amount of data to be transmitted to the secondary node is greater than a threshold.

In some embodiments, the master node is an eNB conforming to 3GPP Long Term Evolution (LTE) specifications, wherein the secondary node is a gNB conforming to 5G New Radio (NR) specifications.

In some embodiments, the UE may be configured to request deactivation or deconfiguration of subcarriers if the NR branch is in Carrier Aggregation (CA) setup. When the scheduling rate is low on the NR branch, the UE may request the gNB to deactivate (or deconfigure) secondary component carriers (SCCs). (Monitoring SCCs that are configured but not activated costs more effort than LTE due to beamforming.) Either DCI or MAC-CE can be used to instruct the UE to deactivate or even de-configure SCCs. This applies to both Non-Standalone (NSA) mode and Standalone (SA) mode NR users.

Analysis of Traffic Threshold for Mode Selection

For any UE, traffic can be communicated through the NR branch or LTE branch, and the amount of battery energy consumption may be the distinguishing factor on which branch to select. It is useful to determine the energy consumption on each of NR and LTE for delivering the same application traffic. LTE may be preferred if it takes less energy than NR, when each is required to transmit the data load L within T seconds. See the analytical derivation given in FIG. 16, wherein P represents power, t represents time in one connected DRX cycle, T represents total time, and R represents throughput, N represent number of connected mode DRX cycles. Subscripts T, P, O, SSB and BM respectively denote traffic, PDCCH monitoring, off, synchronization signal block and beam management. RSSB is the Synchronization Signal Block (SSB) duration used for beam management averaged in a 20 ms cycle (could be different based on UE mobility). The threshold 1600 on the right hand side of the last inequality of FIG. 16 is based on power consumption, throughput performance and UE behavior (BM). It may also change based on RF condition. LTE is more energy efficient than NR, and thus preferred, if the application layer traffic rate is less than the threshold. (In this case, the UE may advantageously request deactivation of the LTE branch, e.g., using any of the various mechanisms disclosed herein.) Transmission of data through active NR branch is preferred if application layer traffic rate is higher than the threshold.

New Radio Branch Deactivation Based on Feedback from User Equipment

As shown earlier, the traffic rate that UE is expecting determines the preference of data transmission between LTE and NR branch. As an alternative to the UE-initiated approaches described above, the initiative can also be taken at NW side, e.g., based on UE feedback on traffic rate.

In some embodiments, UE may send back the power efficiency optimal traffic threshold back to MCG periodically for it to determine the NR branch (de)-activation for the UE together with other factors (e.g., NW load). The periodic feedback of the power optimal traffic threshold may be based on one or more of: UE's window observation of the UE's mobility, RF condition, LTE and NR configuration, etc.

In some embodiments, a method 1700 for operating a wireless user equipment (UE) device may be performed as shown in FIG. 17 (which is on the same drawing sheet as FIG. 15). (The method 1700 may also include any subset of the elements, embodiments and features described above in connection with FIGS. 1-16.) The wireless UE device may be configured as variously described above, e.g., as described in connection with user equipment 600 of FIG. 6. The method 1700 may be performed by a processing element of the wireless UE device.

As shown at 1710, while the wireless UE device is in a state of dual connectivity to a master node and a secondary node, the processing element may perform operations 1715 and 1720. The master node may correspond to a first radio access technology; and the secondary node may correspond to a second radio access technology different from the first radio access technology.

At 1715, the processing element may transmit a traffic threshold, wherein the traffic threshold represents a boundary between (a) traffic rates sufficiently small so that reduction in activity relative to the secondary node is recommended and (b) traffic rates sufficiently large so that reduction in activity relative to the secondary node is not recommended.

At 1720, the processing element may receive a message directing the UE device to enter of mode of reduced activity relative to the secondary node from the master node or the secondary node.

In some embodiments, the traffic threshold may be transmitted to the master node. In an alternative embodiment, the traffic threshold may be transmitted to the secondary node.

In some embodiments, the processing element may be enter into said mode of reduced activity relative to the secondary node in response to receiving the above described message.

In some embodiments, the traffic threshold may be determined (e.g., calculated by the processing element) based on one or more factors. For example, the one or more factors may include measurement of mobility of the wireless UE device. As another example, the one or more factors may include measurement of condition of RF channel relative to the secondary node. As another example, the one or more factors may include a configuration of the UE device with respect to a radio access technology (RAT) corresponding to the master node. As another example, the one or more factors may include a configuration of the UE device with respect to a radio access technology (RAT) corresponding to the secondary node.

In some embodiments, the threshold may be computed as described above in connection with the analysis of FIG. 16.

In some embodiments, the master node is an eNB conforming to 3GPP Long Term Evolution (LTE) specifications, wherein the secondary node is a gNB conforming to 5G New Radio (NR) specifications.

In some embodiments, while NR branch is active, gNB may configure UE to report an event when the expected UE traffic in the (NW configured) future time T is less than a certain threshold R, where R can be a function of UE's own power optimal threshold $R_{opt}$ and a gNB configured parameter $R_{Nw}$, e.g., $R=\min(R_{opt}, R_{NW})$, where $\min(*,*)$ is the minimum operator. In other words, the NW may be notified by UE using this event report when the expected traffic is lower than the threshold, and thus, could cause UE power inefficiency. Master Cell Group (MCG) may then consider whether to de-activate the NR branch for this UE.

In some embodiments, a method 1800 for operating a wireless user equipment (UE) device may performed as shown in FIG. 18 (which is on the same drawing sheet as FIG. 15). (The method 1800 may also include any subset of the elements, embodiments and features described above in connection with FIGS. 1-17.) The wireless UE device may be configured as variously described above, e.g., as described in connection with user equipment 600 of FIG. 6. The method 1800 may be performed by a processing element of the wireless UE device.

As shown at 1810, while the wireless UE device is in a state of dual connectivity to a master node and a secondary node, the processing element may perform operations 1815 and 1820. The master node may correspond to a first radio access technology; and the secondary node may correspond to a second radio access technology different from the first radio access technology.

At 1815, the processing element may transmit an event report to the master node or the secondary node, wherein the event report indicates that uplink traffic from the UE device to the secondary node is expected to be less than a traffic threshold.

At 1820, the processing element may receive a command from the master node or the secondary node, wherein the command directs the UE device to reduce activity relative to the secondary node.

In some embodiments, the processing element may receive a message (e.g., a configuration message) that enables the UE device to generate and transmit the event report.

In some embodiments, the master node is an eNB conforming to 3GPP Long Term Evolution (LTE) specifications; and the secondary node is a gNB conforming to 5G New Radio (NR) specifications.

Network Behavior

In some embodiments, the network (e.g., the gNB) may signal the UE to reduce its baseband and RF operation for power saving. UE context is still in RAN (Radio Access Network). Thus, when UE is brought back out of power saving state, no RRC configuration or reconfiguration is needed, similar to RRC Inactive. This is to reduce the overhead.

A number of operations may be slowed down or suspended in order to save UE power consumption. For example, the UE may slow down or suspend monitoring for downlink control information (DCI). As another example, the UE may slow down or suspend RRM (mobility) measurement. As another example, the UE may slow down or suspend the measurement and/or reporting of CSI such as CQI, PMI and/or RI. As another example, the UE may slow down or suspend beam management and reporting. (RRM stands for Radio Resource Management. CQI is an acronym for Channel Quality Indicator. PMI is an acronym for precoding matrix index. RI is an acronym for rank indicator.)

There are various ways to signal the slow down or suspension of said operation(s) to the UE, e.g., via DCI, or via MAC CE (Medium Access Control—Control Element), or via RRC (Radio Resource Control).

Network Behavior: DCI Monitoring Reduction

In some embodiments, power may be saved by reducing the monitoring of downlink control information (DCI) on the NR branch. NR DCI monitoring reduction can be achieved via signaling 1910 transmitted by the NR node (i.e., the gNB), e.g., as shown in FIG. 19A. For example, the signaling may be used to enable change of the UE BWP (Bandwidth Part), so that there is a sparser search space for control information within the BWP. As another example, the signaling may be used to enable change of the UE discontinuous reception (DRX) cycle, so that DRX wakeup occurs less frequently. As another example, the signaling may be used to disable DCI monitoring for fixed duration.

Alternatively, NR DCI monitoring reduction can be achieved via signaling 1960 transmitted by the LTE node (i.e., the eNB), e.g., as shown in FIG. 19B. The LTE node may signal the UE to suspend DCI monitoring in NR. The wake up procedure can be based either on LTE signaling or expiration of a timer, as suggested at 1965.

Network Behavior: RRM and Beam Management Reduction

In some embodiments, the network (e.g., the gNB) may instruct the UE to relax or slow down its RRM and beam management procedure. In different embodiments, the signaling may come from LTE or from NR.

For Radio Resource Management (RRM) relaxation, the NW may perform one or more of the following.

A. The network (NW) may signal the UE to perform only UE autonomous cell reselection (i.e., no measurement report or NW assisted handover) on NR cells.

B. The NW may reduce the RRM measurement requirement, especially the periodicity, etc.

C. The NW may configure a measurement gap on the LTE branch for UE to measure the NR branch, i.e., a temporal gap in which the UE is not expected to make measurements on the LTE branch. This may ensure that only one RF chain needs to be on, e.g., for inter-band EN-DC. The measurement gap is preferably sufficiently large to cover the RF tuning time and allow the UE to capture CSI-RS for Synchronization Signal Block (SSB) on the NR branch. The measurement report may be sent on the LTE branch. (CSI-RS is an acronym for channel state information—reference signal.)

For beam management relaxation, the NW may perform one or more of the following.

A. The NW may signal the UE to monitor only a subset of reference signals (RSs) for beam management, e.g., only CSI-RS, only subset of CSI-RS, only SSB etc.

B. The NW may signal the UE to suspend or reduce its beam management reporting, especially the periodic reporting.

C. The NW may signal the UE to reduce or suspend the UL beam management, i.e., Sounding Reference Signal (SRS) transmission.

D. The NW may signal the UE to operate in signal panel only mode.

Measurement After Wakeup

In some embodiments, after the user equipment (UE) exits the power saving mode in NR, the network (NW), e.g., the gNB, may explicitly or implicitly instruct the UE to perform measurement reporting. The signaling may be realized via Downlink Control Information (DCI), or MAC CE, or RRC. The signaling may be sent via either the LTE branch or the NR branch.

In some embodiments, the signaling may enable the UE to perform one or more of the following. For example, the signaling may enable the UE to resume DCI monitoring (or make DCI monitoring more frequent) on the NR branch. As another example, the signaling may enable the UE to resume RRM (or make RRM measurement and reporting more frequent) on the NR branch. As another example, the signaling may enable the UE to resume CSI/BW measurement and reporting (or make CSI/BW measurement and reporting more frequent) on the NR branch. BW is an acronym for Bandwidth.

The signaling may also request immediate UE measurement report for UE to acquire the latest information about RRM or CSI or beam condition. The resource allocation may be performed via New Radio DCI or UE Uplink RACH or a scheduling request. (RACH is an acronym for random access procedure.)

Figure 20:
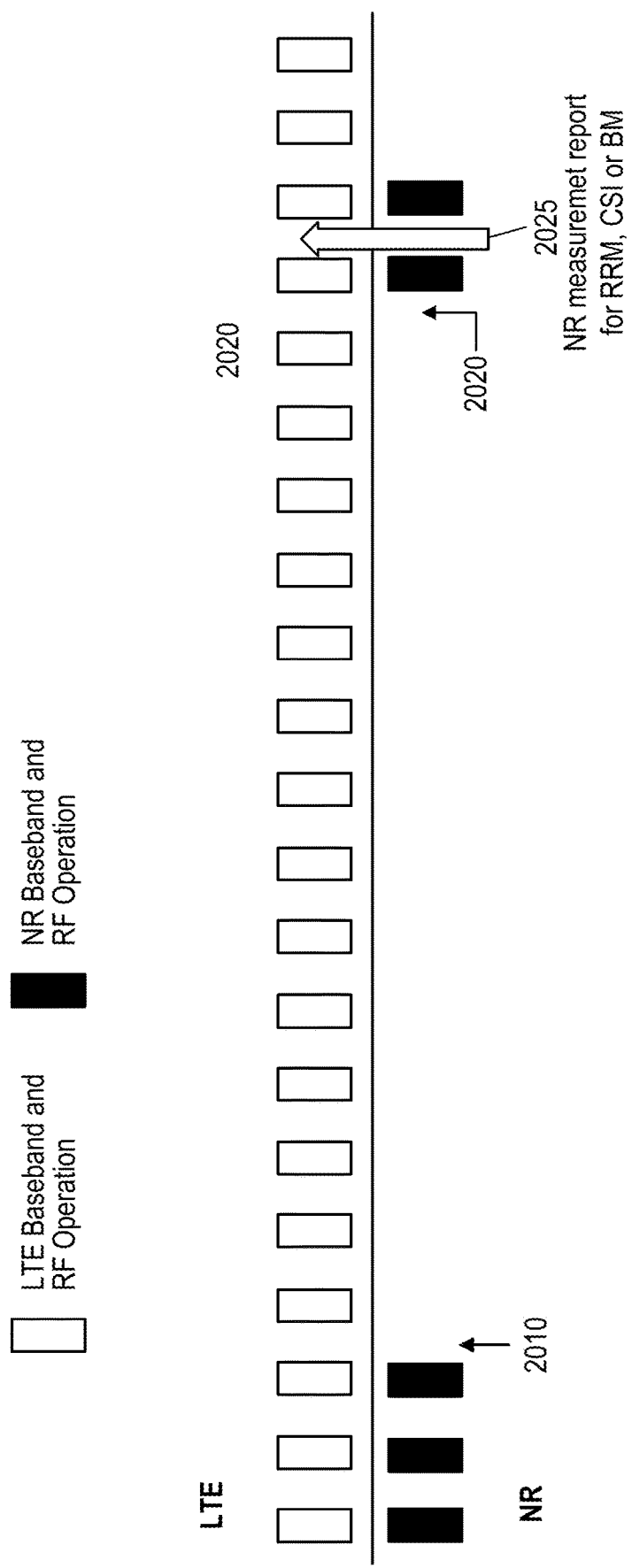
FIG. 20 illustrates an example of waking up a New Radio branch after the New Radio branch has entered a power saving mode, according to some embodiments.

As shown in FIG. 20, baseband and RF operations of the UE with respect to the NR branch stops when the NR branch enters deep power saving, as illustrated at 2010. (Baseband and RF operations of the UE's NR branch are represented by the black rectangles. Baseband and RF operations of the UE's LTE branch are represented by the white rectangles.) In response to the signaling 2020 from the network, UE resumes NR operations. The UE may send an NR measurement report 2025 for RRM, Channel State Information (CSI) or Beam Management (BM) to the network in response to the above described signaling, as suggested by the upward directed arrow.

FIG. 21—Deactivation of Secondary Cells of Secondary Node

In some embodiments, a method 2100 for operating a wireless user equipment (UE) device may performed as shown in FIG. 21. (The method 2100 may also include any subset of the elements, embodiments and features described above in connection with FIGS. 1-20.) The wireless UE device may be configured as variously described above, e.g., as described in connection with user equipment 600 of FIG. 6. The method 2100 may be performed by a processing element of the wireless UE device.

As shown at 2110, while the wireless UE device is in a state of dual connectivity to a master node and a secondary node, the processing element may perform operations 2115 and 2120. The master node may correspond to a first radio access technology; and the secondary node may correspond to a second radio access technology different from the first radio access technology.

At 2115, the processing element may receive a message directing the UE device to reduce activity relative to the secondary node, enabling the UE to conserve power, e.g., when data transfer activity of the UE relative to the secondary node is low.

At 2120, the processing element may reduce said activity of the UE device relative to the secondary node in response to receiving the message.

In some embodiments, the action of reducing said activity of the UE device relative to the secondary node may include reduction of monitoring of downlink control information (DCI) relative to the secondary node.

In some embodiments, the action of reducing said activity of the UE device relative to the secondary node may include changing a bandwidth part (BWP) associated with the UE device to reduce a search space for said downlink control information.

In some embodiments, the action of reducing said activity of the UE device relative to the secondary node may include changing a discontinuous reception cycle (DRX) so that DRX wakeup is less frequent.

In some embodiments, the action of reducing said activity of the UE device relative to the secondary node may include suspending an action of monitoring for Downlink Control Information (DCI) at least for a period of time.

In some embodiments, the action of reducing said activity of the UE device relative to the secondary node may include reduction of beam management operations relative to the secondary node.

In some embodiments, the action of reducing said activity of the UE device relative to the secondary node may include monitoring a subset of reference signals for beam management with respect to the secondary node.

In some embodiments, the action of reducing said activity of the UE device relative to the secondary node includes suspending or reducing reporting related to beam management with respect to the secondary node.

In some embodiments, the action of reducing said activity of the UE device relative to the secondary node may include suspending or reducing uplink beam management with respect to the secondary node.

In some embodiments, the action of reducing said activity of the UE device relative to the secondary node may include operating in a signal panel only mode with respect to the secondary node.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless user equipment (UE) device comprising:
a radio subsystem configured to send and receive radio signals; and
a processing element coupled to the radio subsystem, wherein the processing element is configured to:
while the wireless UE device is in a state of dual connectivity to one or more cells of a master cell group (MCG) of a master node and one or more cells of a secondary cell group (SCG) of a secondary node, transmit, to the master node, a deactivation request to have the SCG deactivated;
receive, from the master node subsequent to transmission of the deactivation request, a deactivation indication of the SCG having been deactivated;
perform communications with the master node subsequent to reception of the deactivation indication; and
transmit, to the master node subsequent to performing the communications, an SCG activation request to have the SCG activated.

2. The wireless UE device of claim 1, wherein, upon entering said state of dual connectivity, the processing element is further configured to perform one or more of the following:
cell measurement and reporting relative to a primary cell of the secondary cell group, with longer cycle than prior to entering said state;
beam tracking relative to the primary cell of the secondary cell group, with longer cycle than prior to entering said state;
reporting information regarding channel quality relative to the primary cell of the secondary cell group, with longer cycle than prior to entering said state;
performing transmissions of sounding reference signals (SRSs) to the primary cell of the secondary cell group, with longer cycle than prior to entering said state.

3. The wireless UE device of claim 1, wherein, upon entering said state of dual connectivity, the processing element is configured to perform one or more of the following:
terminate monitoring of a Physical Downlink Shared Channel (PDSCH) of a primary cell of the secondary cell group;
terminate monitoring of a Physical Downlink Control Channel (PDCCH) of the primary cell of the secondary cell group;
disable transmission on a Physical Uplink Shared Channel (PUSCH) associated with the secondary cell group;
terminate measurements related to radio link monitoring (RLM) with respect to the secondary cell group.

4. The wireless UE device of claim 1, wherein said state of dual connectivity is entered in response to a command from the master node or the secondary node, wherein the command is received as part of a Radio Resource Control (RRC) message, or as part of a Medium Access Control (MAC) Control Element, or as part of downlink control information (DCI).

5. The wireless UE device of claim 1, wherein the processing element is further configured to start an inactivity timer in response to receiving uplink and/or downlink scheduling with respect to the secondary node,
wherein, in response to receiving additional uplink and/or downlink scheduling with respect to the secondary node while the inactivity timer is running, the processing element is configured to restart the inactivity timer,
wherein said state of dual connectivity is entered in response to expiration of the inactivity timer.

6. The wireless UE device of claim 1, wherein the processing element is further configured to start a timer in response to determining that a first traffic rate relating to data communication with the secondary node is less than a threshold,
wherein, in response to determining that a subsequent traffic rate relating to data communication with the secondary node is greater than the threshold, the processing element is configured to stop the timer,
wherein said state of dual connectivity is entered in response to expiration of the timer.

7. The wireless user equipment (UE) device of claim 1, wherein the master node corresponds to a first radio access technology, wherein the secondary node corresponds to a second radio access technology different from the first radio access technology.

8. A wireless user equipment (UE) device comprising:
a radio subsystem configured to send and receive radio signals; and
a processing element coupled to the radio subsystem, wherein, while the wireless UE device is in a state of dual connectivity to a master node and a secondary node, the processing element is configured to:
transmit a traffic threshold, wherein the traffic threshold represents a boundary between (a) traffic rates sufficiently small so that reduction in activity relative to the secondary node is recommended and (b) traffic rates sufficiently large so that reduction in activity relative to the secondary node is not recommended, wherein the master node corresponds to a first radio access technology, wherein the secondary node corresponds to a second radio access technology different from the first radio access technology; and
receive a message directing the UE device to enter of mode of reduced activity relative to the secondary node from the master node or the secondary node.

9. The wireless UE device of claim 8, wherein the traffic threshold is transmitted to the master node.

10. The wireless UE device of claim 8, wherein the processing element is configured to enter into said mode of reduced activity relative to the secondary node in response to receiving the message.

11. The wireless UE device of claim 8, wherein the traffic threshold is determined based on one or more factors, wherein the one or more factors include one or more of the following:
mobility of the wireless UE device;
condition of RF channel relative to the secondary node;
a configuration of the UE device with respect to a radio access technology (RAT) corresponding to the master node;
a configuration of the UE device with respect to a radio access technology (RAT) corresponding to the secondary node.

12. The wireless UE device of claim 8, wherein the master node is an eNB conforming to 3GPP Long Term Evolution (LTE) specifications, wherein the secondary node is a gNB conforming to 5G New Radio (NR) specifications.

13. A wireless user equipment (UE) device comprising:
a radio subsystem configured to send and receive radio signals; and
a processing element coupled to the radio subsystem, wherein, while the wireless UE device is in a state of dual connectivity to a master node and a secondary node, the processing element is configured to:
- transmit an event report to the master node or the secondary node, wherein the event report indicates that uplink traffic from the UE device to the secondary node is expected to be less than a traffic threshold, wherein the master node corresponds to a first radio access technology, wherein the secondary node corresponds to a second radio access technology different from the first radio access technology; and
- receive a command from the master node or the secondary node, wherein the command directs the UE device to reduce activity relative to the secondary node.

14. The wireless UE device of claim 13, wherein the processing element is configured to receive a message that enables the UE device to generate and transmit the event report.

15. The wireless UE device of claim 13, wherein the master node is an eNB conforming to 3GPP Long Term Evolution (LTE) specifications, wherein the secondary node is a gNB conforming to 5G New Radio (NR) specifications.

16. A non-transitory memory medium storing program instructions, wherein the program instructions, when executed by a processing element, cause a user equipment (UE) device to perform operations comprising:
- while the wireless UE device is in a state of dual connectivity to one or more cells of a master cell group (MCG) of a master node and one or more cells of a secondary cell group (SCG) of a secondary node, transmitting, to the master node, a deactivation request to have the SCG deactivated;
- receiving, from the master node subsequent to transmitting the deactivation request, a deactivation indication of the SCG having been deactivated;
- performing communications with the master node subsequent to receiving the deactivation indication; and
- transmitting, to the master node subsequent to performing the communications, an SCG activation request, to have the SCG activated.

17. The non-transitory memory medium of claim 16, wherein the operations further comprise, upon entering said state of dual connectivity, performing one or more of the following:
- cell measurement and reporting relative to a primary cell of the secondary cell group, with longer cycle than prior to entering said state;
- beam tracking relative to the primary cell of the secondary cell group, with longer cycle than prior to entering said state;
- reporting information regarding channel quality relative to the primary cell of the secondary cell group, with longer cycle than prior to entering said state;
- performing transmissions of sounding reference signals (SRSs) to the primary cell of the secondary cell group, with longer cycle than prior to entering said state.

18. The non-transitory memory medium of claim 16, wherein the master node corresponds to a first radio access technology, wherein the secondary node corresponds to a second radio access technology different from the first radio access technology.

19. The non-transitory memory medium of claim 16, wherein said state of dual connectivity is entered in response to a command from the master node or the secondary node, wherein the command is received as part of a Radio Resource Control (RRC) message, or as part of a Medium Access Control (MAC) Control Element, or as part of downlink control information (DCI).

20. The non-transitory memory medium of claim 16, wherein the operations further comprise:
- starting an inactivity timer in response to receiving uplink and/or downlink scheduling with respect to the secondary node,
- restarting the inactivity timer in response to receiving additional uplink and/or downlink scheduling with respect to the secondary node while the inactivity timer is running,
- wherein said state of dual connectivity is entered in response to expiration of the inactivity timer.

\* \* \* \* \*